(12) United States Patent
Steimel

(10) Patent No.: US 7,725,251 B2
(45) Date of Patent: May 25, 2010

(54) SYSTEMS AND METHODS FOR COMPENSATION FOR A DYNAMIC AXLE LOAD TRANSFER

(75) Inventor: Christoph Steimel, Mainz (DE)

(73) Assignee: GM Global Technology Operations, Inc., Detroit, MI (US)

(*) Notice: Subject to any disclaimer, the term of this patent is extended or adjusted under 35 U.S.C. 154(b) by 752 days.

(21) Appl. No.: 11/568,846

(22) PCT Filed: May 6, 2005

(86) PCT No.: PCT/EP2005/005080

§ 371 (c)(1),
(2), (4) Date: Nov. 8, 2006

(87) PCT Pub. No.: WO2005/110835

PCT Pub. Date: Nov. 24, 2005

(65) Prior Publication Data

US 2007/0225896 A1  Sep. 27, 2007

(30) Foreign Application Priority Data

May 10, 2004  (DE) .................. 10 2004 022 892

(51) Int. Cl.
G06F 19/00 (2006.01)
B62D 37/00 (2006.01)
(52) U.S. Cl. .................................... 701/124
(58) Field of Classification Search ................... 701/124
See application file for complete search history.

(56) References Cited

U.S. PATENT DOCUMENTS

| 5,357,434 | A | * | 10/1994 | Zimmer et al. ................. 701/75 |
| 6,199,650 | B1 | * | 3/2001 | Masberg et al. ............. 180/197 |
| 6,324,458 | B1 | | 11/2001 | Takagi et al. |
| 6,371,234 | B2 | | 4/2002 | Yasuda |
| 6,600,974 | B1 | | 7/2003 | Traechtler |

FOREIGN PATENT DOCUMENTS

| DE | 10160353 | 6/2003 |
| EP | 1046571 | 10/2000 |

* cited by examiner

Primary Examiner—Yonel Beaulieu
(74) Attorney, Agent, or Firm—Ingrassia Fisher & Lorenz, P.C.

(57) ABSTRACT

The present invention proposes an improved method for at least partially compensating for the dynamic transfer of an axle load when part of a motor vehicle load dips over at least one front wheel. A demand for a drive moment is applied and thus a time-limited virtually maximum drive moment is produced for the purposes of compensating for the transfer of the axle load. Moreover, for the first time, the present invention proposes a microprocessor and also a control device for carrying out this method in accordance with the invention. Furthermore, a motor vehicle drive is indicated which is equipped with such a control device or such a microprocessor. Finally, software is designated for carrying out the method. A motor vehicle is presented which is equipped with such a control device or such a microprocessor for the execution of the software for carrying out the method in accordance with the invention.

19 Claims, 31 Drawing Sheets

SYSTEMS AND METHODS FOR COMPENSATION FOR A DYNAMIC AXLE LOAD TRANSFER

CROSS-REFERENCE TO RELATED APPLICATIONS

This application is a U.S. National-Stage entry under 35 U.S.C. §371 based on International Application No. PCT/EP2005/005080, filed May 6, 2005, which was published under PCT Article 21(2) and which claims priority to German Application No. DE 10 2004 022 892.2, filed May 10, 2004.

FIELD OF THE INVENTION

The present invention relates to systems and methods for at least partially compensating for the dynamic transfer of an axle load in a motor vehicle.

BACKGROUND

In practice, it is known that the dynamic transfer of an axle load due to the acceleration or deceleration of a motor vehicle causes a change in the opposite sense in the momentary normal force on the front and rear axle. Because of the dependency of the tire cornering force on the normal force, the distribution of the lateral force between the front and the rear axle changes whereby a moment turning into the curve develops during deceleration and a moment turning out of the curve occurs when accelerating.

In correspondence therewith, it is also known in practice that, in certain driving conditions, the subjective feeling of the driver is that the motor vehicle is tilting forward over the front wheels, or is dipping over them such that at least one wheel frequently deflects to almost its maximum extent, as is the case for example when driving to the extreme in a curve or under heavy braking.

Particularly in the case of full braking, the motor vehicle tilts downwardly to a very great extent in the forward direction of travel as a consequence of the dynamic transfer of the axle load. The tires on the front axle are thereby extremely heavily loaded and thus are possibly no longer following linear operating points. At these operating points, the transmissible longitudinal and transverse forces are smaller than in the linear range. At the same time, the loading on the tires on the rear axle is substantially reduced and consequently they can only transfer low braking and cornering forces. Control of the vehicle as desired by the driver is then frequently no longer possible without systems for regulating the dynamics of the vehicle's movement.

The reduction in the load on the rear axle in the event of driving in a curve while applying full braking or in the event of driving rapidly or to the maximum extreme in a curve can be of such an extent that the rear wheel on the inner side of the curve lifts completely off the road and can no longer transfer any braking or lateral forces whatsoever. The front wheel on the outer side of the curve and also the rear wheel on the outer side of the curve are then frequently loaded in such a manner that they begin to slide so that the vehicle eventually breaks away.

In the context of the developments in integrated chassis control systems that have been known in practice up to now, ("integrated chassis control," or "ICC"), one has sought to stabilize the motor vehicle in every conceivable driving situation by networking the essential systems for the dynamics of the vehicle's movement as one component of an interactive dynamic driving system ("interactive driving system," or: "IDS"). Such systems for regulating the dynamics of the vehicle's movement and/or the electronic stability program ("electronic stability program," or "ESP") communicate with further control devices such as the brake assistant for example, whereby the respective items of data required for this purpose are transmitted over a data bus system ("controller area network," or "CAN" bus). Hereby, the data can be transmitted over data bus systems of differing speeds in dependence on the importance thereof. Thus, for example, the time-sensitive signals in regard to the dynamics of the vehicle's movement are transmitted over a "high speed" data bus having a data transmission rate of at least 500 KB per second.

A dynamic transference of the axle load, such as occurs when the motor vehicle plunges over the front wheels, for example, can thus be detected more or less in real time and an electronic damping regulation process ("continuous damping control," or "CDC") can be activated, for example, in order to counteract the transfer of the axle load. Such expensive electronic damping control systems are, for example, based on shock absorbers controlled by solenoid valves whose characteristic can be continuously adapted to the road conditions, the vehicle movement, and the driving pattern in a stepless, precise and continuous manner in dependence on the prevailing data. Several acceleration sensors or the like can supply the signals required for optimal damping to the CDC control unit in combination with further signals from the CAN bus. The control unit calculates the requisite damping force for each wheel in real time, for example, by means of a characteristic diagram or the like. The adaptation of the shock absorbers can then take place within milliseconds. The vehicle bodywork can thus be kept steady; pitching motions when braking and bodywork movements when driving in curves or when driving over bumps are reduced to a noticeable extent.

Although the successes and improvements in regard to the dynamic transference of the axle load that can be attained thereby are indeed promising and have also proved satisfactory in practice, they are still inadequate for fully controlling a motor vehicle in every driving situation.

BRIEF SUMMARY OF THE INVENTION

Systems and methods in accordance with the present invention compensate for the change in the opposite sense of the momentary normal force on the front and/or rear axle caused by a dynamic transfer of the axle load in motor vehicles.

In one embodiment, a drive moment is increased or reduced for the purposes of balancing-out or compensating for the transference of the axle load without thereby substantially altering the speed of the motor vehicle.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A first exemplary driving situation, which proceeds on the basis of traveling in a straight line at 100 km/h and then a suddenly-implemented full braking action, is illustrated in FIGS. 1 to 5.

A dynamic transfer of the axle load occurs when applying full braking. It depends upon, among other things, the height of the motor vehicle's center of gravity. The dynamic transfer of the axle load causes an alteration in the wheel contact forces. The ratio between the wheel braking torque and the drive moment is, e.g., approx. 10:1 to 20:1. If, during a full braking action with blocking wheels, one now increases the drive moment for a short period of time, then this moment can only be supported by means of the rear axle since the wheels cannot be accelerated due to the higher braking torques. This effect increases the wheel contact force on the rear axle and reduces the wheel contact force at the front axle. Since a motor vehicle has a relatively large mass inertia, any acceleration of the vehicle is sufficiently small or can be discounted when the drive moment is only effective for a short period.

FIG. 1(a) shows, as measured, the position of the accelerator pedal in percent with respect to time. In FIG. 1(b), the position of the brake pedal or the waveform of the brake circuit signal BLS is shown, as measured, with respect to time in percent. It is perceivable herefrom that, approximately at a time point 1.8 seconds from the taking of the measurement, the brake pedal is fully depressed, i.e., a BLS signal suddenly occurs which represents a full braking action. In FIG. 1(c), the waveform of the brake cylinder pressure in bar is illustrated with respect to time. The rapid build up of the brake pressure with the onset of the full braking action in accordance with FIG. 1(b) correlates very well with the measurement. Furthermore, the appertaining, measured steering angle is shown in FIG. 1(d), the angle being zero degrees before the braking action and fluctuating slightly about the zero-degree line within a range of +/−5° after the full application of the brakes.

Figure 1:
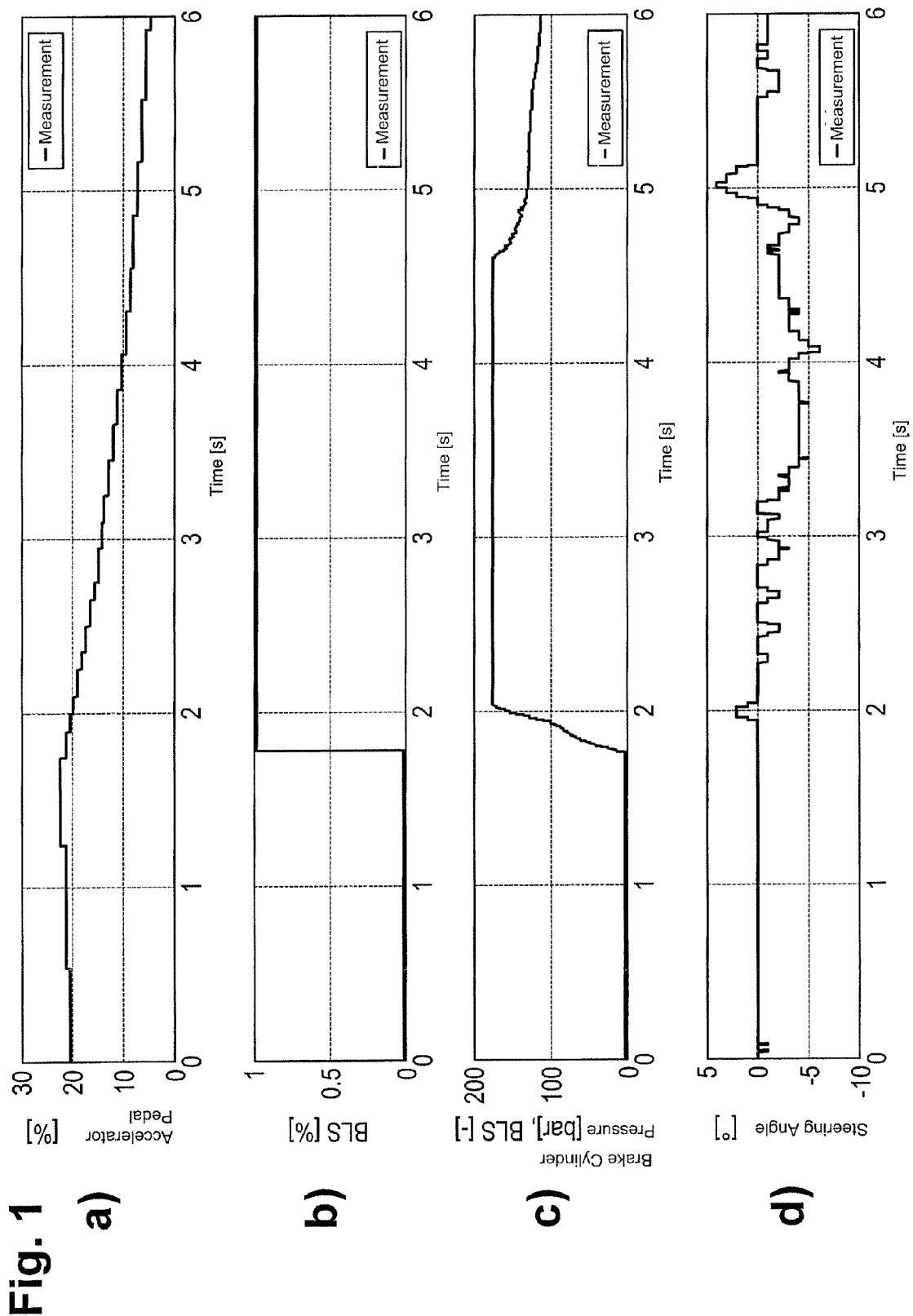
FIGS. 1(a)-(d) show various graphs of data from measurements made in the case of an ABS supported full braking action from 100 km/h when traveling in a straight line.

The results of the measurement illustrated in FIG. 1 were recorded during a trial which was carried out using a tire bearing the Bridgestone brand of Turanza, 215/55/R16 having a tire pressure of 2.7 bar in the front tires and 3.2 bar in the rear tires and a coefficient of friction μ=1.1 between the tire road-contact areas and the dry road.

Figure 2:
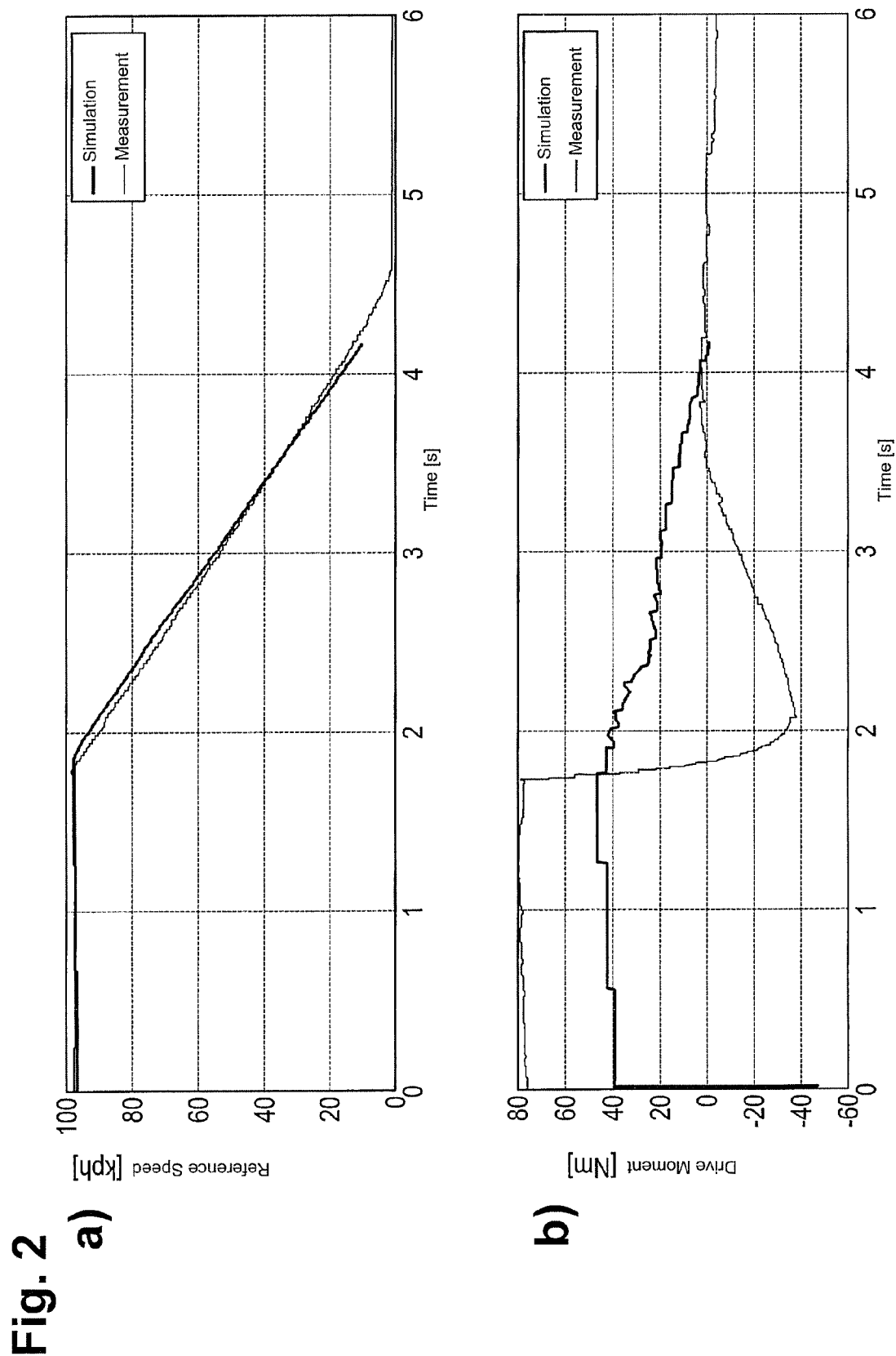
FIGS. 2(a)-(b) show the reference speed appertaining to the measured data shown in FIG. 1 the appertaining drive moment, supplemented by corresponding simulation results for comparison purposes.

The driving situation shown in FIG. 1 is further illustrated in FIG. 2. FIG. 2(a) shows the waveform of the reference speed in km/h with respect to time in seconds. FIG. 2(b) shows the waveform of the drive moment in Nm with respect to time in seconds. The measured values are plotted by the thin or fainter solid lines. The simulated items of data are implemented in thick or bolder solid lines. The simulation agrees amazingly well with the measured data. It has thus been verified that the selected simulation, i.e. the complex set of equations underlying the simulation, is capable of accurately mimicking a measured driving state.

Figure 3:
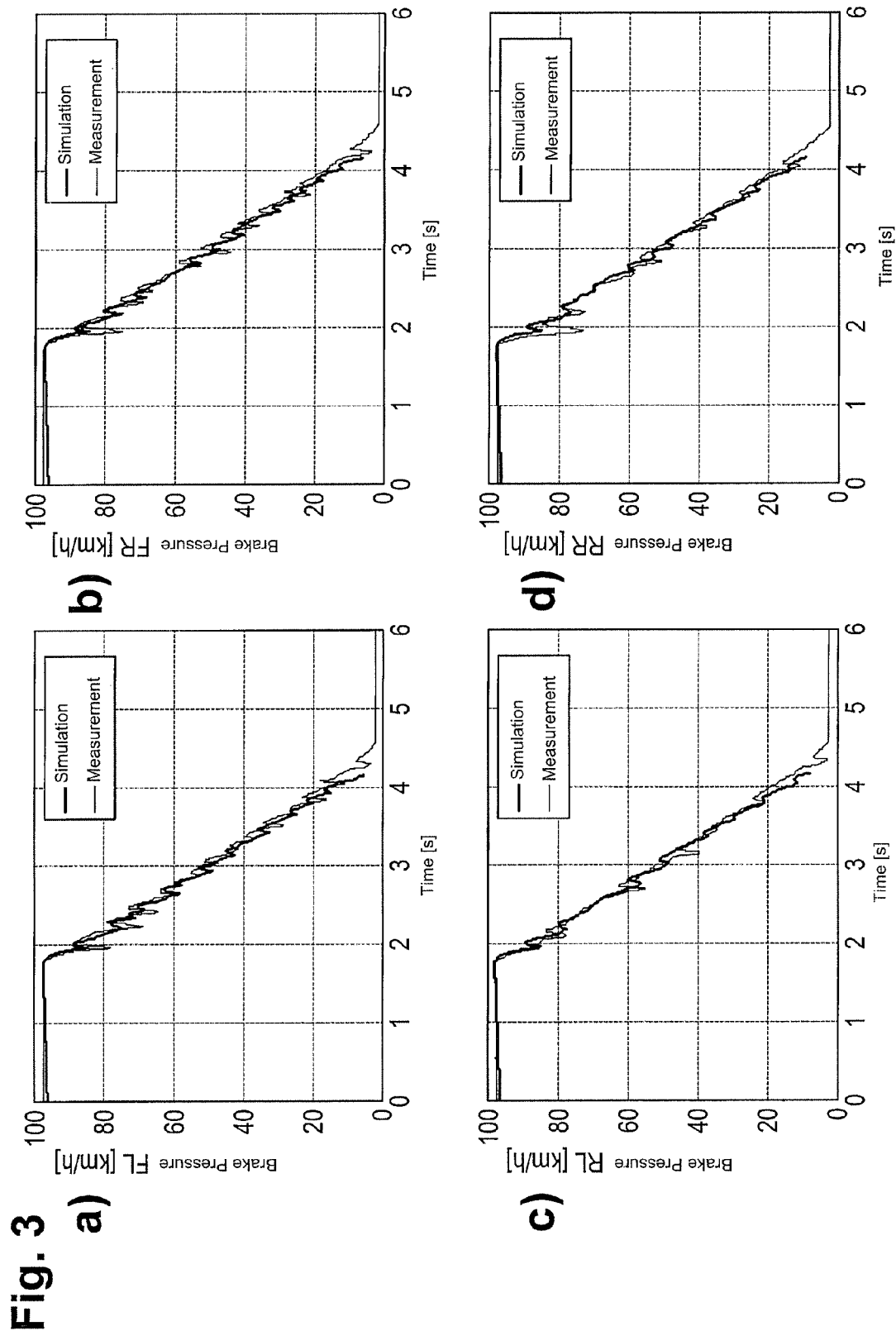
FIGS. 3(a)-(d) show a comparison of the simulated data (thick, bold solid lines) relative to the measurement (thin, faint solid lines) in regard to the wheel speeds of the four wheels of the motor vehicle corresponding to the situation illustrated in FIGS. 1 and 2.

In FIG. 3, the speed of each wheel in km/h (front left to rear right) with respect to time in seconds is illustrated in FIGS. 3(a)-(d). The measured data is again illustrated by a thin or fainter solid line. The simulation is shown using a thick or bolder solid line. The front left wheel is illustrated in FIG. 3(a). FIG. 3(b) shows the values for the front right wheel. The rear left wheel is illustrated in FIG. 3(c). The rear right wheel is illustrated in FIG. 3(d). It clearly follows from the direct comparison of the simulation and the measurement that the simulation properly reproduces the measurement.

The subdivision of the sheet of the drawing introduced in FIG. 3 will also be used in the further Figures so that a uniform numbering or referencing system for the states illustrated in regard to the respective wheels from front left to rear right is made use of. It follows therefore that FIG. 3(a) above left is representative of the left front wheel and FIG. 3(d) below right is representative of the right rear wheel.

Figure 4:
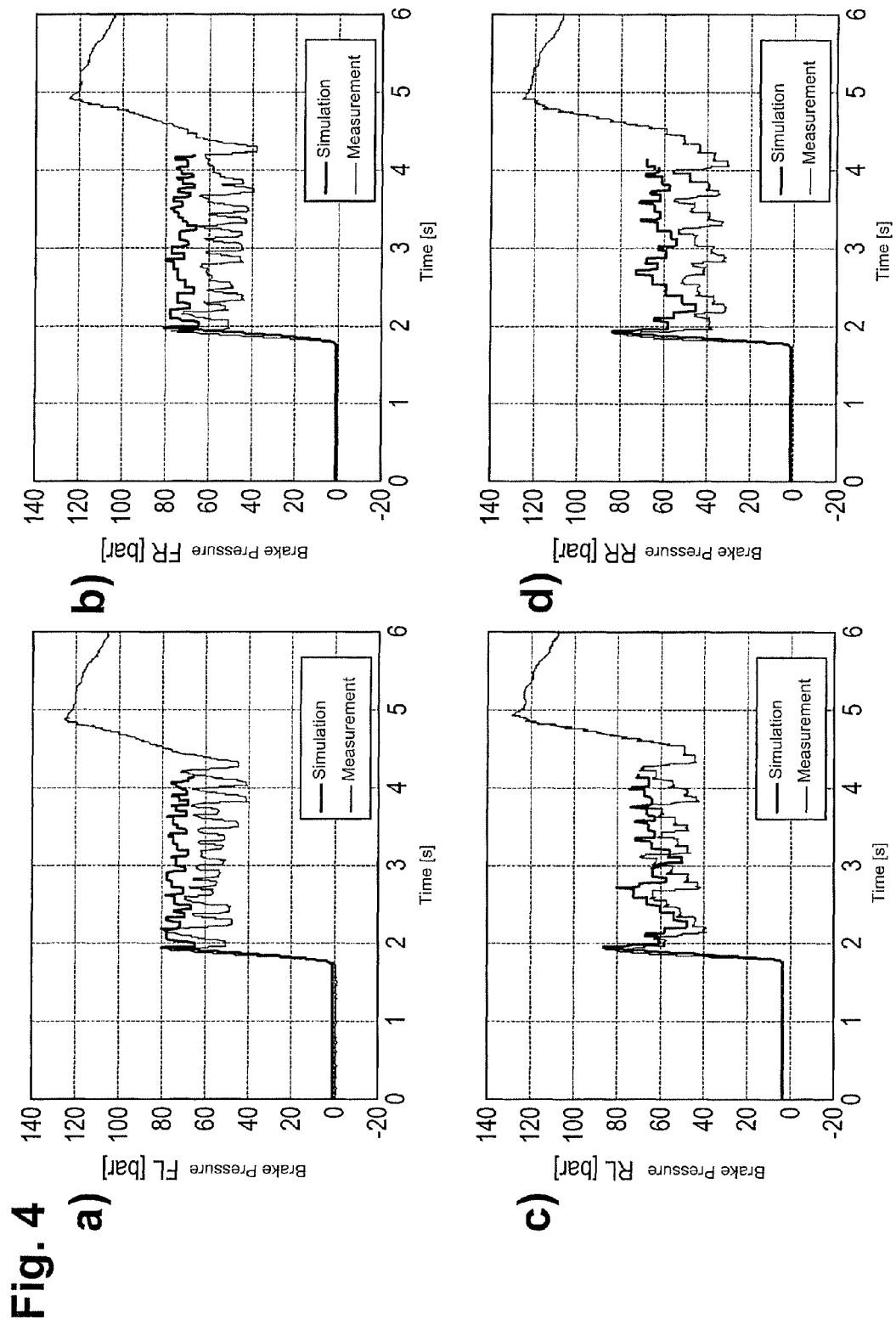
FIG. 4(*a*) show the appertaining brake pressures prevailing at the respective wheels in respect of the situation shown in FIGS. 1 to 3.

Accordingly, in FIG. 4, the brake pressure at the front left wheel is illustrated in FIG. 4(a), that at the front right wheel is illustrated in FIG. 4(b), that at the rear left wheel in FIG. 4(c) and that at the rear right wheel is illustrated in FIG. 4(d), wherein again the thin or fainter solid line represents the measured data and the thick or bolder solid line represents the simulation. Here too, the measurement and the simulation are in surprisingly good agreement.

Figure 5:
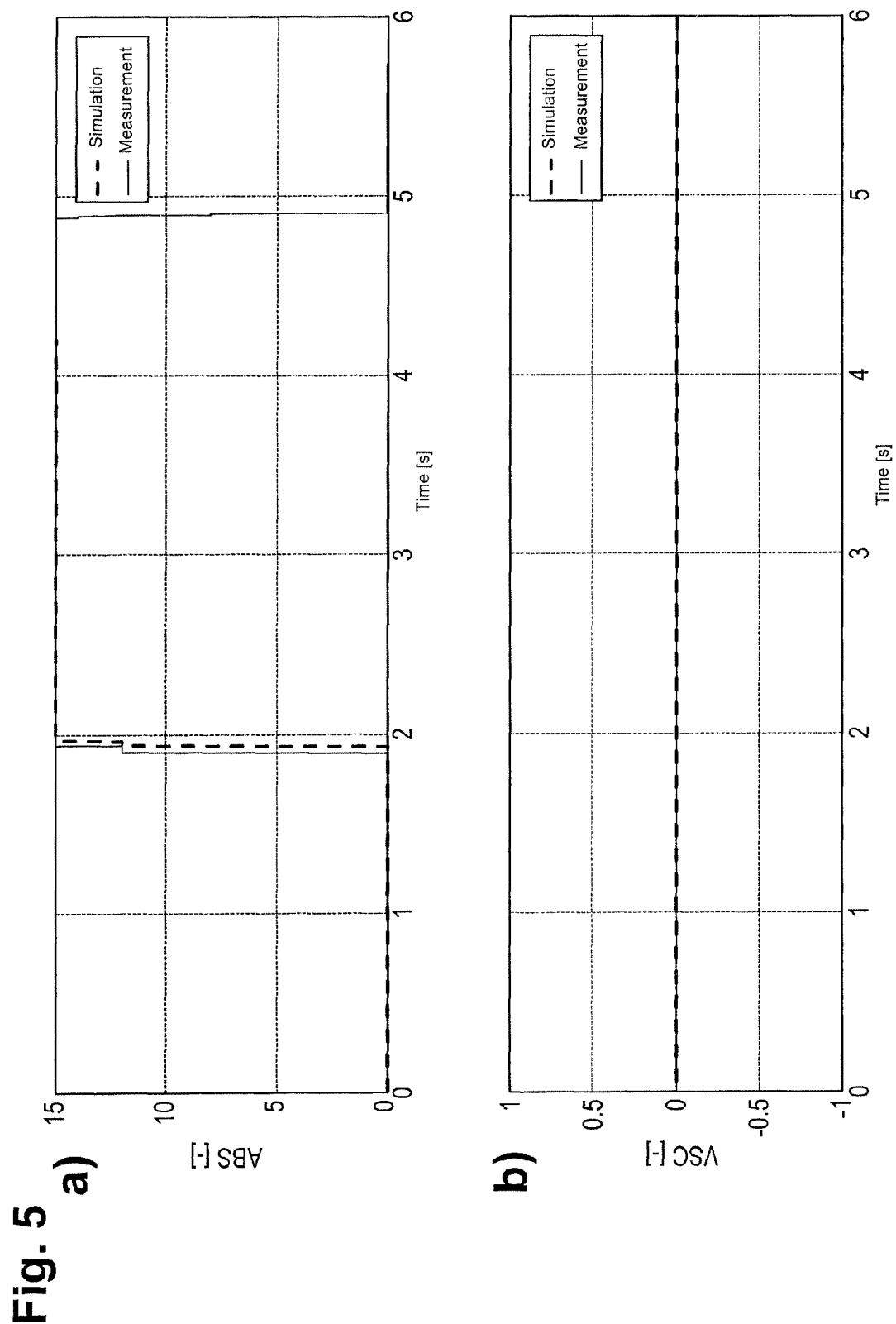
FIGS. 5(*a*)-(*b*) show the appertaining ABS flag and the appertaining VSC signal waveform, wherein the simulation is represented by a thick, bold dashed line and the measurement by a thin, faint solid line.
Figure 6:
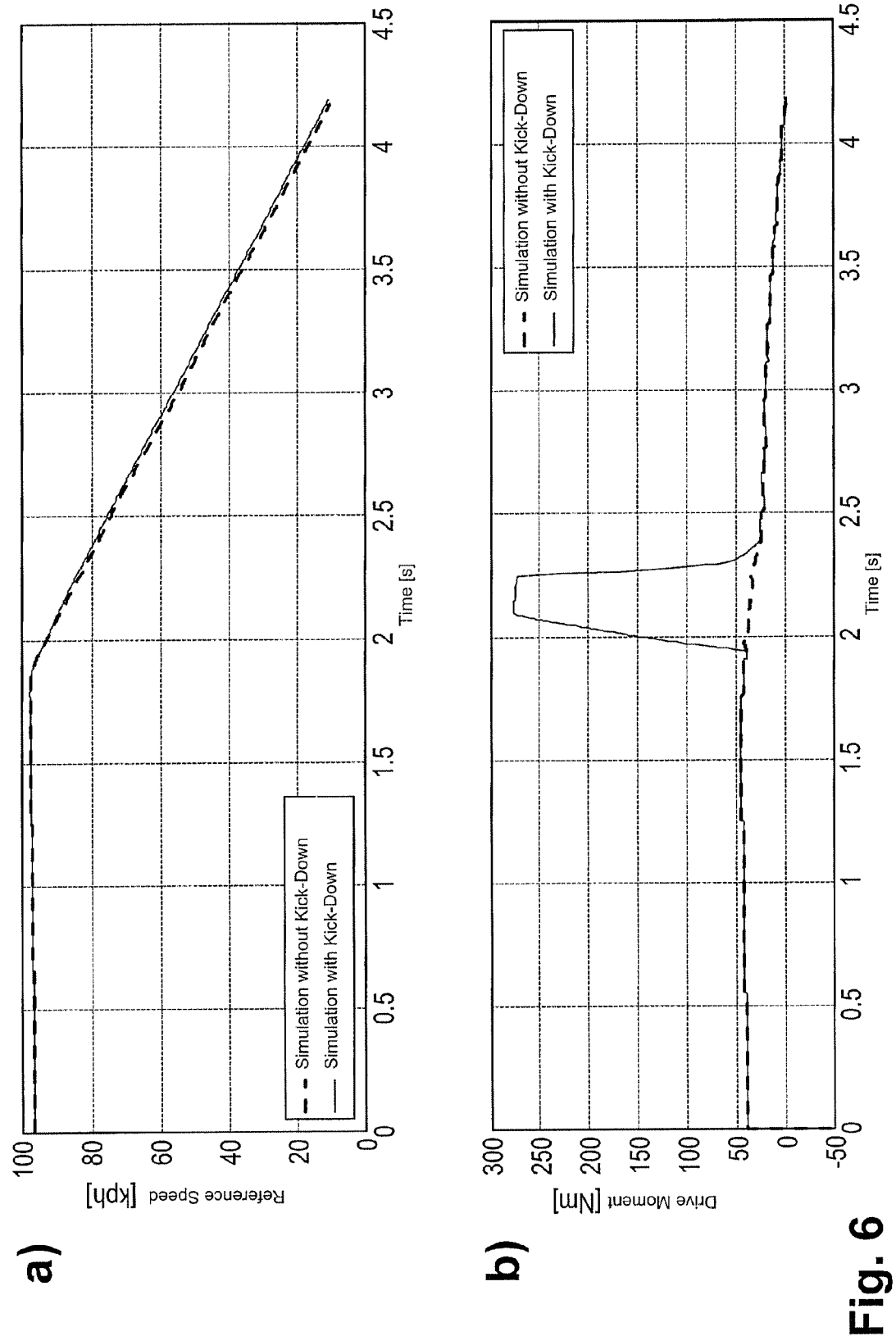
FIGS. 6(*a*)-(*b*) show a simulation without kick-down (thick, bolder dashed lines) and a simulation with kick-down (thin, fainter solid lines) of an ABS supported full braking action from 100 km/h when traveling in a straight line, wherein FIG. 6(*a*) illustrates the reference speed with respect to time, and FIG. 6(*b*) illustrates the drive moment with respect to time, such as has been illustrated in an analogous manner in FIG. 2 for the purposes of a comparison of the simulation and the measurement.

In FIG. 5, the waveform of the ABS flag with respect to time is shown in FIG. 5(a). It is apparent therefrom, that the ABS flag is set quasi with the depression of the brake pedal in both the measurement and the simulation. FIG. 5(b) shows the waveform of the VSC signal that is usable in a "vehicle stabilization control" system.

The exemplary situation previously discussed in FIGS. 1 to 5 is portrayed afresh in FIGS. 6 to 11, this situation again beginning with an initial speed of 100 km/h while traveling in a straight line wherein shortly afterwards full braking suddenly occurs but now however it is illustrated with the aid of two simulations which can be compared with one another, namely a simulation without kick-down (thick or bolder dashed line) on the one hand and a simulation with kick-down (thin or fainter solid line) on the other hand.

FIG. 6(a) shows the reference speed in km/h with respect to time in seconds, which decreases linearly with the onset of full braking. FIG. 6(b) shows the drive moment in Nm with respect to time in seconds, this staying relatively constant somewhat under 50 Nm but, in the case of the simulation with kick-down, suddenly shoots up to over 250 Nm for a brief period at about 1.9 seconds after the beginning of the simulation, and suddenly drops down again about 0.3 seconds later. This jump-like increase of the drive moment of the engine of over 250 Nm resulted from the burst of gas provoked by the kick-down which is intended to be utilized for compensation purposes or balancing-out the dynamic axle load distribution.

The speed of the four wheels of the motor vehicle is again shown in FIGS. 7(a)-(d). The thick or bolder solid line shows the simulation without kick-down. The thin or fainter solid line shows the simulation with kick-down. This distinction in shading will be maintained in all the further Figures, which show simulation data.

Figure 7:
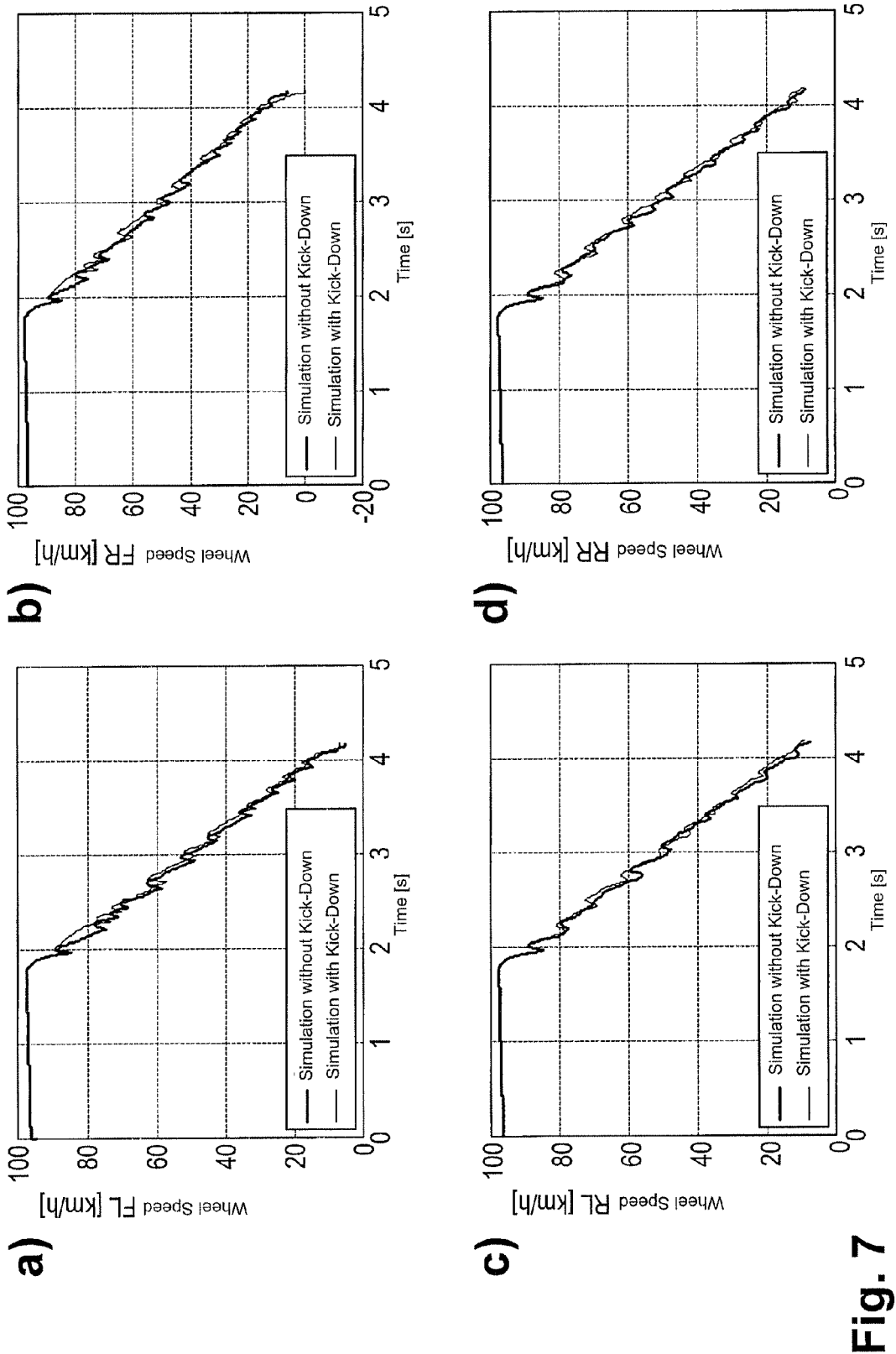
FIGS. 7(*a*)-(*d*) show the wheel speeds of the four wheels appertaining to the driving situation illustrated in FIG. 6, wherein the thick or fat, bold solid lines again represent the simulation without kick-down and the thin or fainter solid lines the simulation with kick-down.

A reduction of the wheel speed of all four wheels with respect to time after the onset of the full braking action is perceptible in FIG. 7, wherein it can be seen that the kick-down has no effect upon the decreasing speed. The wheel speeds match one another very well in both the case of the simulation without kick-down and that of the simulation with kick-down and clearly show the improvement obtained at the front axle (onset of wheel slip) at the point of applying the brakes due to the kick-down. Thus, despite the kick-down, there is no acceleration of the vehicle.

Figure 8:
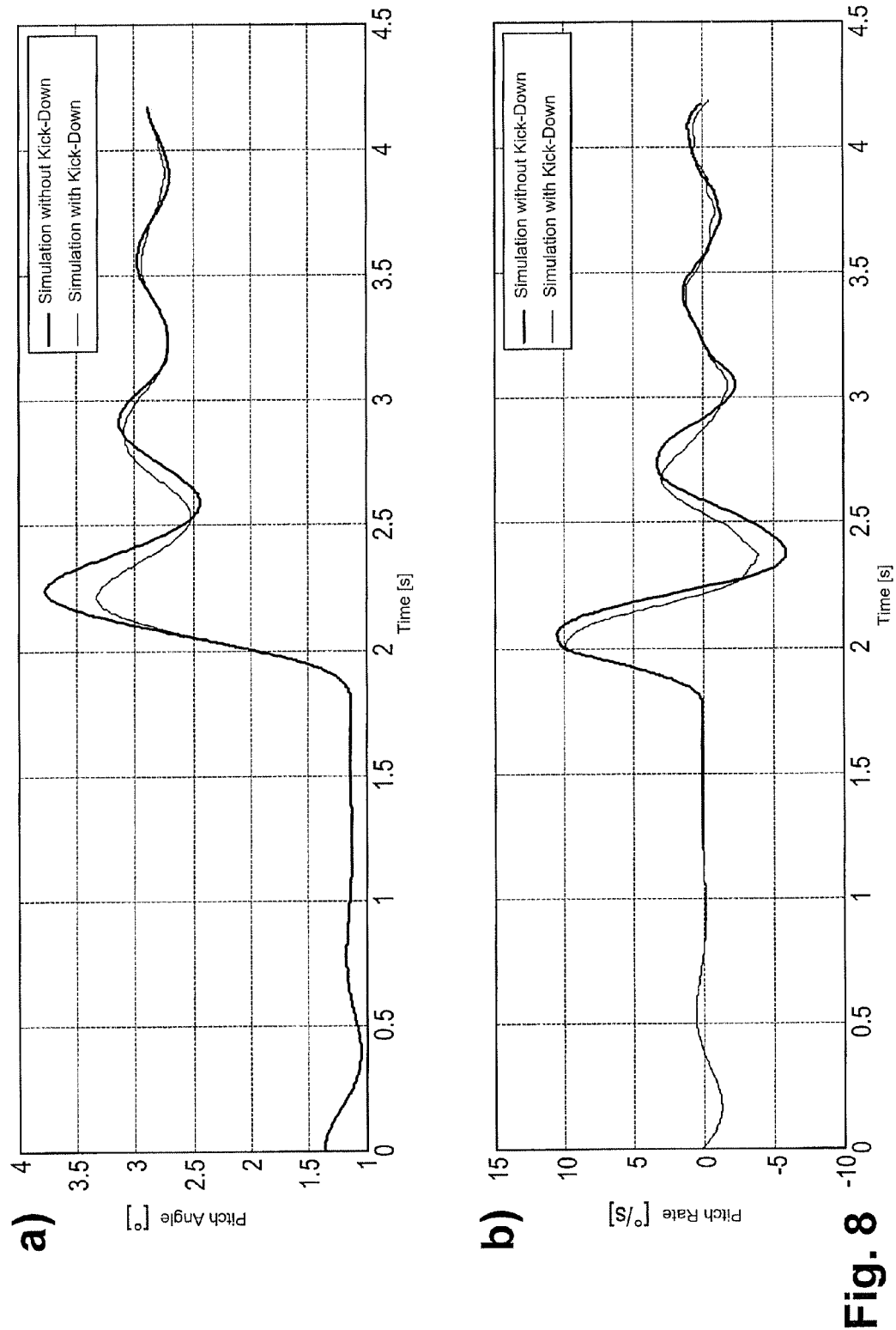
FIGS. 8(*a*)-(*b*) show the appertaining pitch angle of the motor vehicle and the appertaining pitch rate in respect of the driving situation shown in FIGS. 6 and 7.

This is quite different in the situation shown in FIG. 8. FIG. 8 shows the pitch angle of the vehicle with respect to time, and FIG. 8(b) shows the pitch rate with respect to time. Here, it is very perceptible that the pitch angle is significantly less noticeable and oscillates more weakly thereafter in the case of full braking with kick-down than the pitch angle without kick-down. Equally, the pitch rate is less noticeable and oscillates more weakly thereafter, i.e. fades away more quickly. This thus immediately verifies that the method in accordance with the invention is suitable for forcing a compensation of or producing an improvement in the dynamic transfer of the axle load during a full braking action by means of an accelerator stroke for example.

Figure 9:
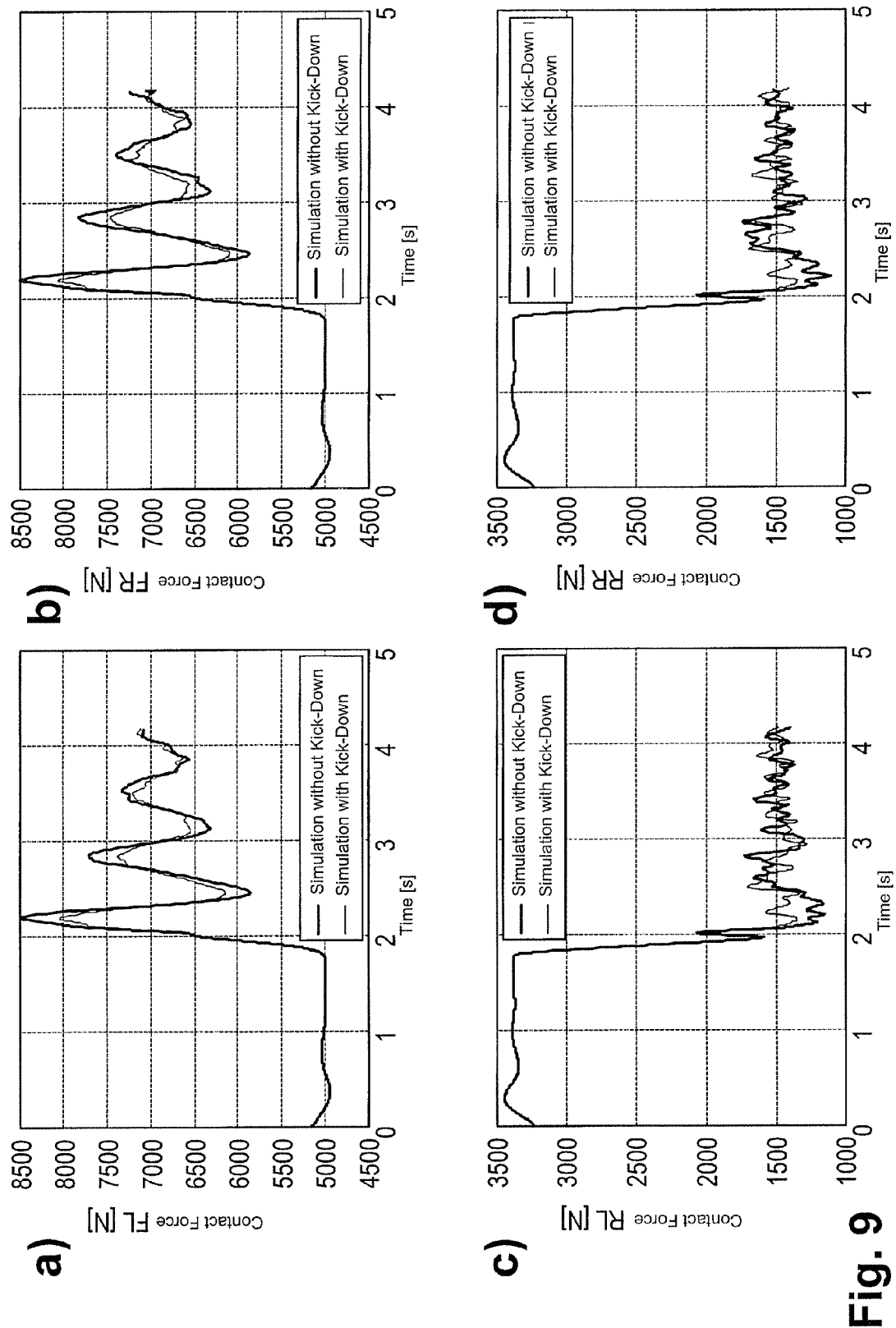
FIGS. 9(*a*)-(*d*) show the contact forces appertaining to each wheel for the states shown in FIGS. 6 to 8.

In FIG. 9, the contact force on each wheel appertaining to the situation illustrated in FIGS. 6 to 11 is shown in FIGS. 9(a) for the front left to (d) for the rear right. Herein, it is clear that the thin or fainter solid lines for the simulation with kick-down deflect somewhat less and hence represent smaller contact forces for the front wheels than is the case without kick-down (thick or bolder solid lines). This means that here, the attainment of a critical state of the contact force which would normally be expected due to the dynamic transfer of the axle load in the forward direction when the vehicle dives is suppressed. On the other hand, on the basis of the contact forces on the rear wheels, it is perceptible that these are substantially higher directly at the point of applying the brakes in a situation with kick-down than without kick-down so that significantly better braking forces can be transmitted, which leads to an altogether more stable driving situation.

Furthermore, it should also be noted in FIG. 8 that the kick-down implemented at a time point of 1.94 seconds from the beginning of the measurement leads to a reduction of the pitch angle of at least 10 percent.

Furthermore, it should also be noted in FIG. 9 that, without kick-down, the two front wheels must withstand tire contact forces of over 8000 newtons, thereby leaving the linear transmission range of the tire and entering a critical range. In contrast thereto, the contact force with kick-down remains at just about 8000 newtons so that this is still in the linear range. In consequence, improved handling is attainable in this situation. In addition, FIGS. 9(c)-(d) show that by contrast an increase of at least 200 newtons in the contact force on the rear wheels will be registered compared with a simulation without kick-down which accordingly means an additional transmission of braking forces and lateral cornering forces.

Figure 10:
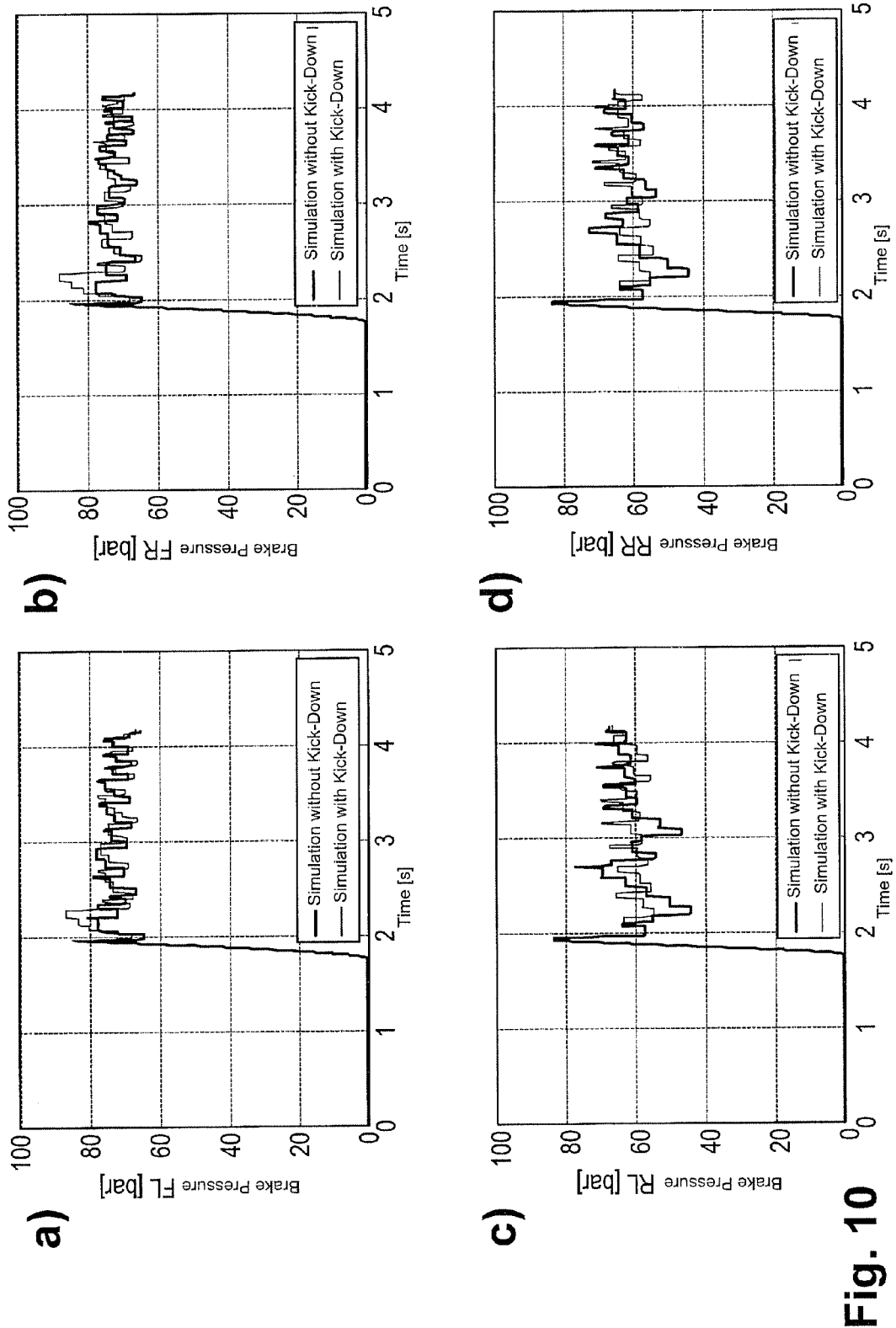
FIGS. 10(*a*)-(*d*) show the brake pressure on each wheel in correspondence with the situation illustrated in FIGS. 6 to 9, wherein the thick or fat bold solid lines again represent the simulation without kick-down and the thin or fainter solid lines the simulation with kick-down.

Altogether then, the result is that transference of the axle load can be at least partially compensated for by the influencing effect of the drive moment. Since the wheel contact force at the front axle is reduced, the tire does not get as far as or enter the limiting range of its transmissible longitudinal forces. In the limiting range, the tire can no longer transmit or cannot transmit an additional longitudinal force due to the already increased contact force; many tires even diminish the longitudinal force at this point. One can appreciate this effect with the aid of the wheel speeds illustrated in FIG. 7. The onset of wheel slip at the front axle at the point of applying the brakes (at approx. 2 seconds) is not so large due to the partial compensation of the dynamic transfer of the axle load. The wheel contact forces at the rear axle are also significantly higher due to the compensation process (c.f. FIG. 9). This in turn enables a higher level of brake pressure at the rear axle which leads to better deceleration (c.f. FIG. 10) and in the long run this means shortened braking distances. The level of the brake pressure at the front axle is likewise better since the tire will not be overloaded due to the smaller wheel contact force (c.f. FIGS. 9 and 10). It can thus be inferred from FIG. 8 that the pitching moment can be partially compensated by virtue of the deliberate effect made upon the drive moment at the point of applying the brakes, whereby the oscillation of the pitching motion fades away more quickly.

Figure 11:
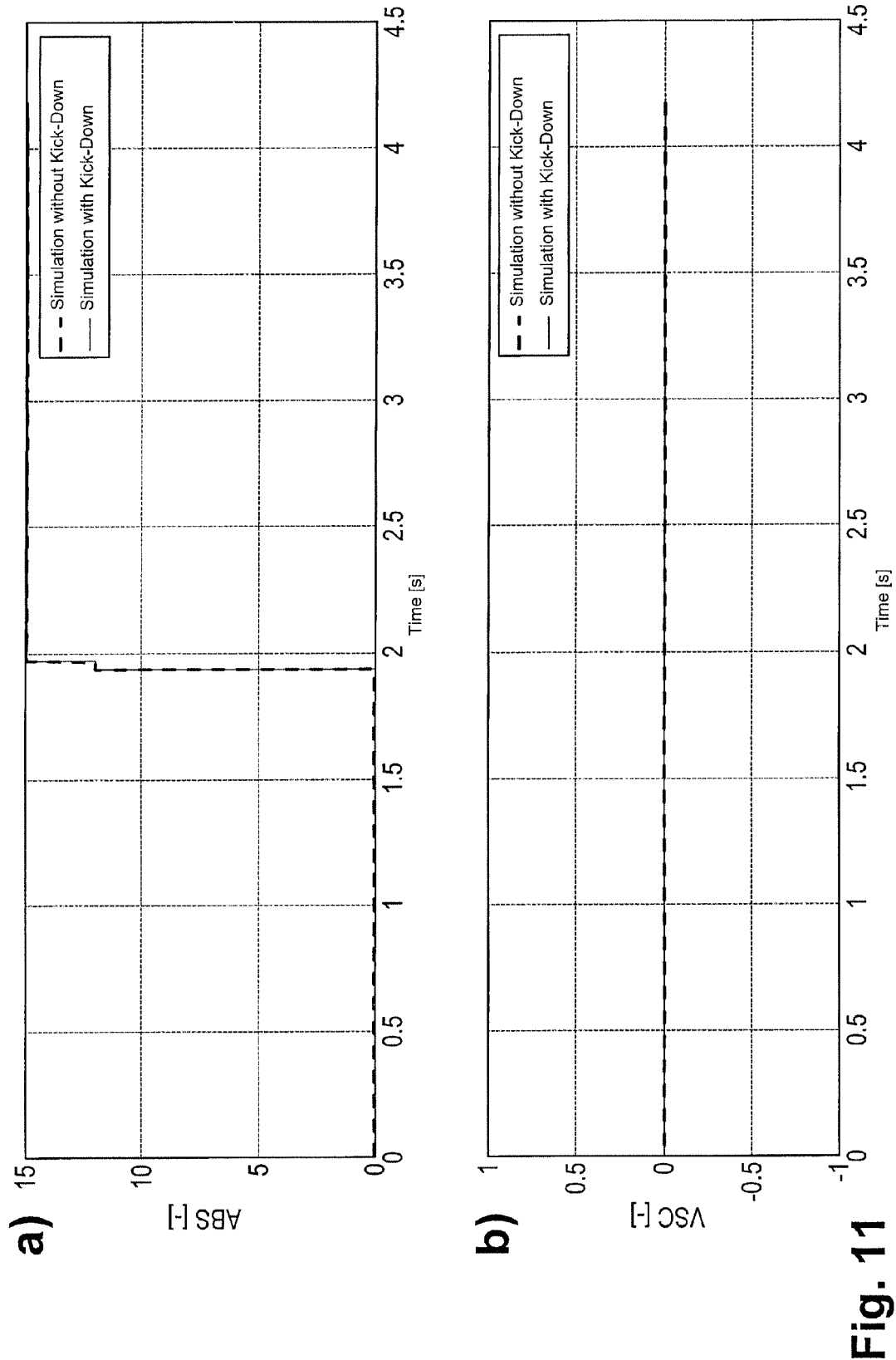
FIGS. 11(*a*)-(*b*) show the appertaining ABS flag and the appertaining VSC signal waveform, the simulation without kick-down being represented by a thick, bold dashed line and the simulation with kick-down by a thin, faint solid line.
Figure 12:
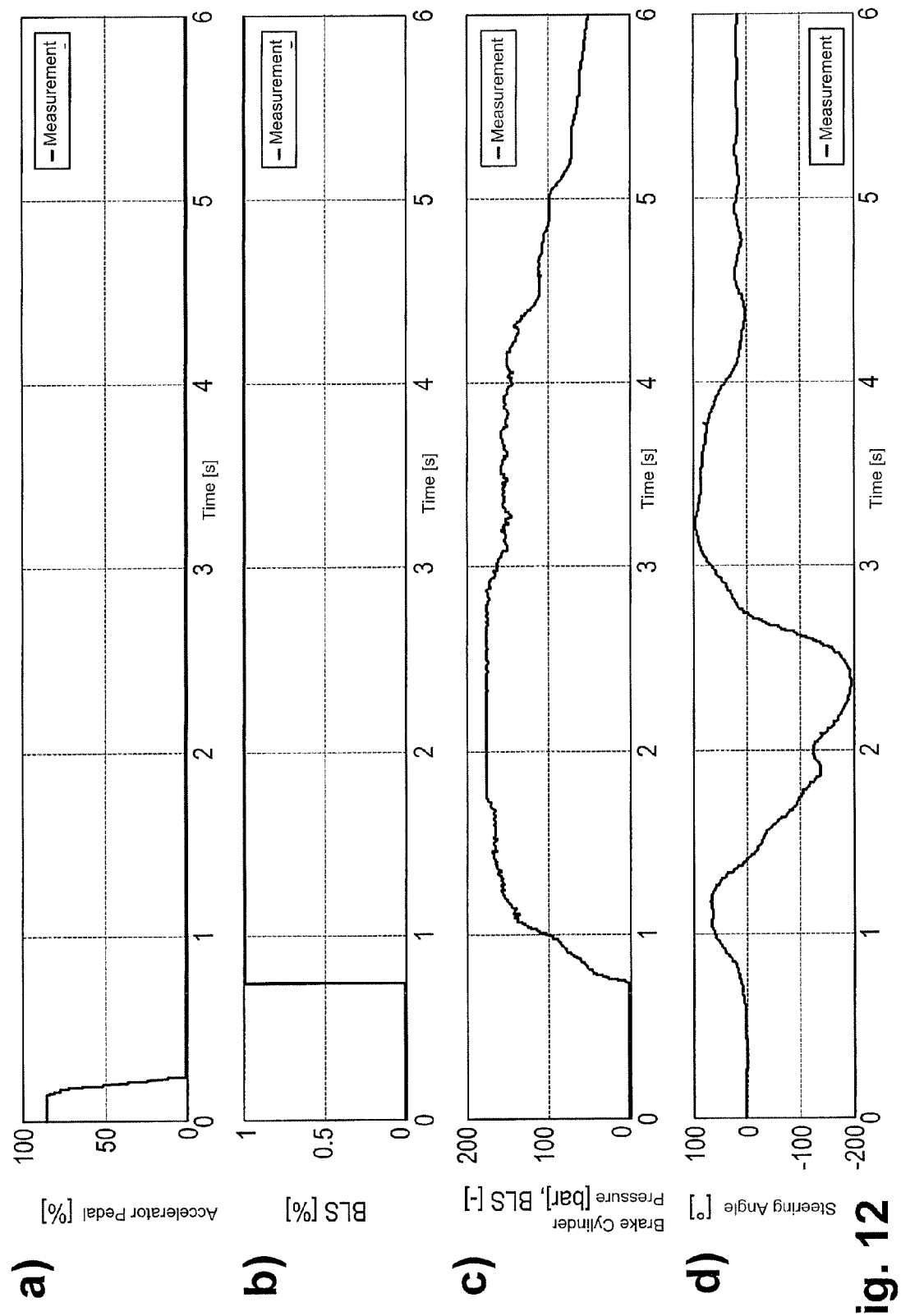
FIGS. 12(*a*)-(*d*) show a measurement (thick or bold solid lines) of different data for a driving situation on the basis of 108 km/h which is similar to that previously given in FIG. 1 for the case of traveling in a straight line, but now however in the case of a rapidly alternating excursion of the steering to the left, to the right and again to the left and then back to the centre in the event of an attempt to drive round an obstacle, wherein the measurement is represented by a thick, bold solid line.

Merely for the sake of completeness, reference is made to the driving situation in FIG. 11, wherein the ABS flag is shown in the appertaining FIG. (a) and the VSC waveform in FIG. (b).

Another exemplary driving situation corresponding to the measurements that have been made is illustrated in FIGS. 12 to 17. On the basis of a speed of 108 km/h and initial travel in a straight line, an evasive maneuver that is braked within the regulating range of the ABS system or involves driving around cones in a left/right combination is simulated here.

In an analogous manner to FIG. 1, the percentage position of the accelerator pedal with respect to time is shown in FIG. 12(a). The position of the brake pedal with respect to time is recorded in FIG. 12(b). It is perceivable therein that the brake pedal is suddenly fully depressed at a time point of approximately 0.8 seconds after the beginning of the measurement. Accordingly, it is apparent from FIG. 12(c) that the brake cylinder pressure, which is recorded in bars therein, builds up in corresponding manner. The steering angle is shown in FIG. 12(d). From this waveform, it follows that the process of driving around cones begins when full braking is applied.

Figure 13:
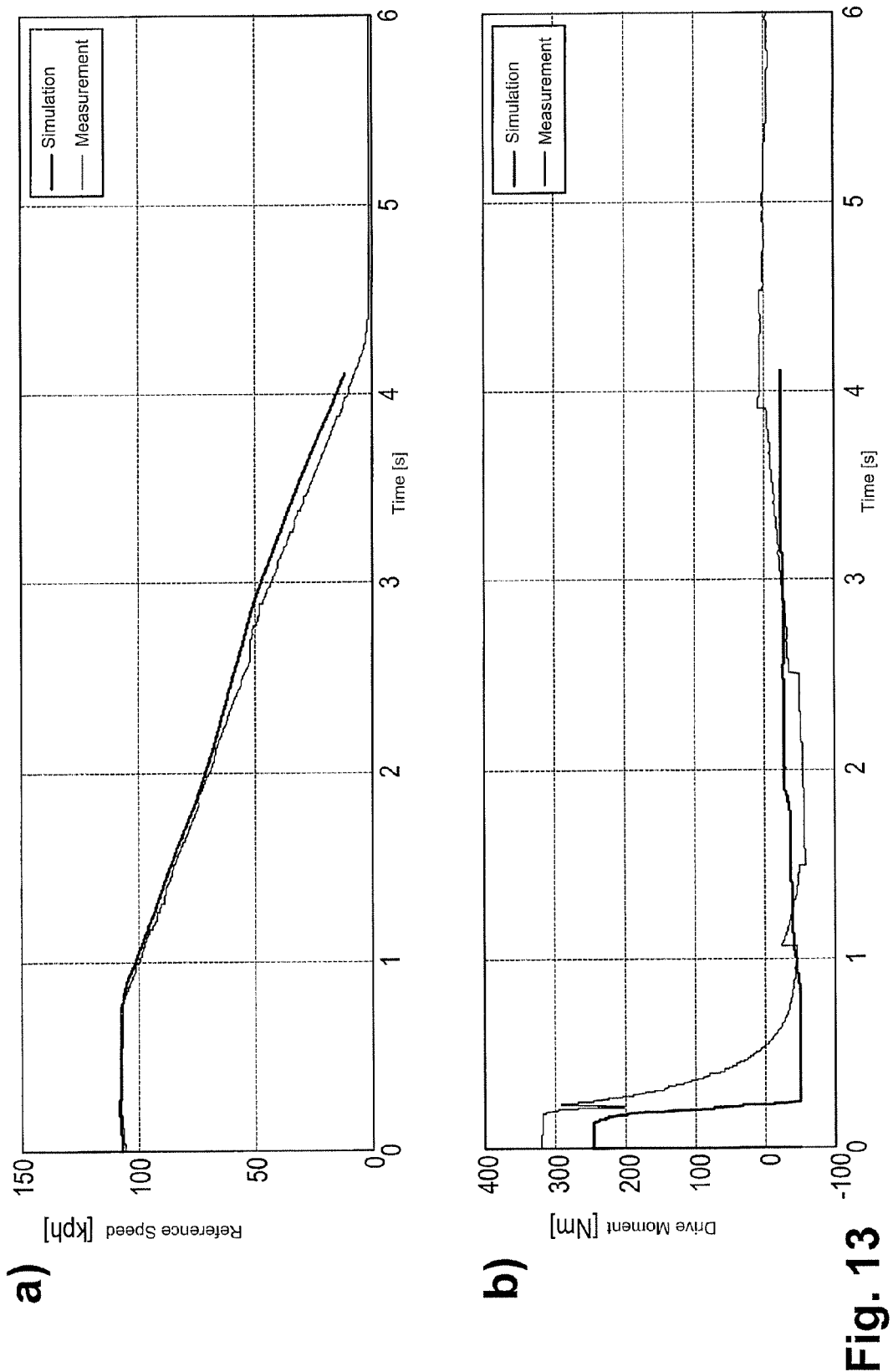
FIGS. 13(*a*)-(*b*) show the reference speed in km/h appertaining to the driving situation depicted in FIG. 12, and the appertaining drive moment in Nm, wherein the simulation is now illustrated by a thick, bold solid line and the measurement is in the form of a thin, fainter solid line, in analogy to the form of illustration selected in FIGS. 2 to 5.

The appertaining reference speed is shown in FIG. 13. The thin or fainter solid line again shows the measurement as was previously the case in FIG. 2. The thick or bolder solid line shows the simulation. The simulation and the measurement fit very well. The applied drive moment of the engine is illustrated in FIG. 13(b). Here too, the measurement (thin or fainter solid line) and the simulation (thick or bolder solid line) are in good agreement with one another.

Figure 14:
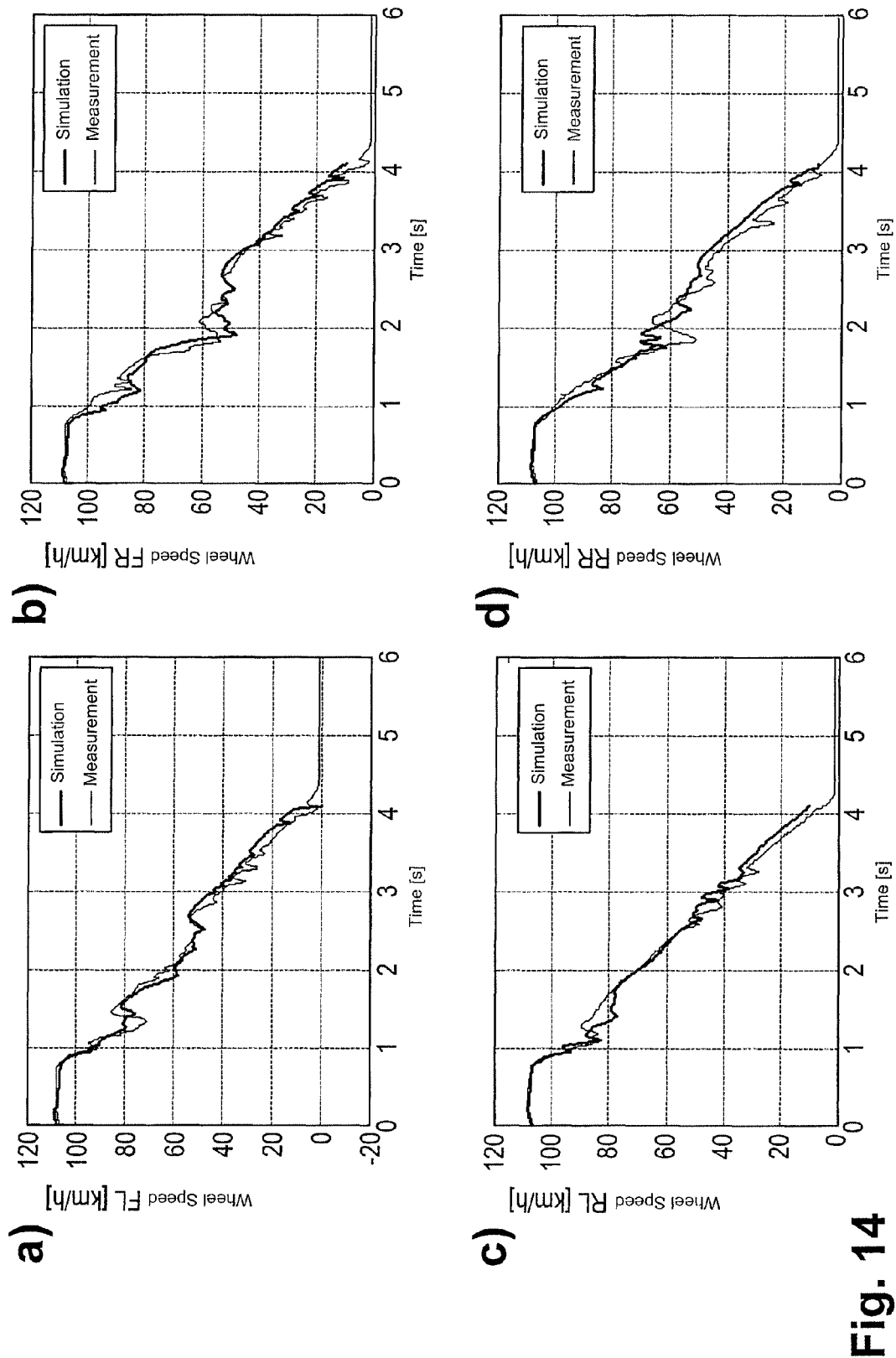
FIGS. 14(*a*)-(*b*) show the simulated (thick or bold solid lines) and the measured (thin or fainter solid lines) wheel speeds of the four wheels in respect of the driving situation shown in FIGS. 12 and 13.

In FIG. 14, the waveform of the respective wheel speeds with respect to time is again shown in the FIGS. 14(a) for the front left to 14(d) for the rear right.

Figure 15:
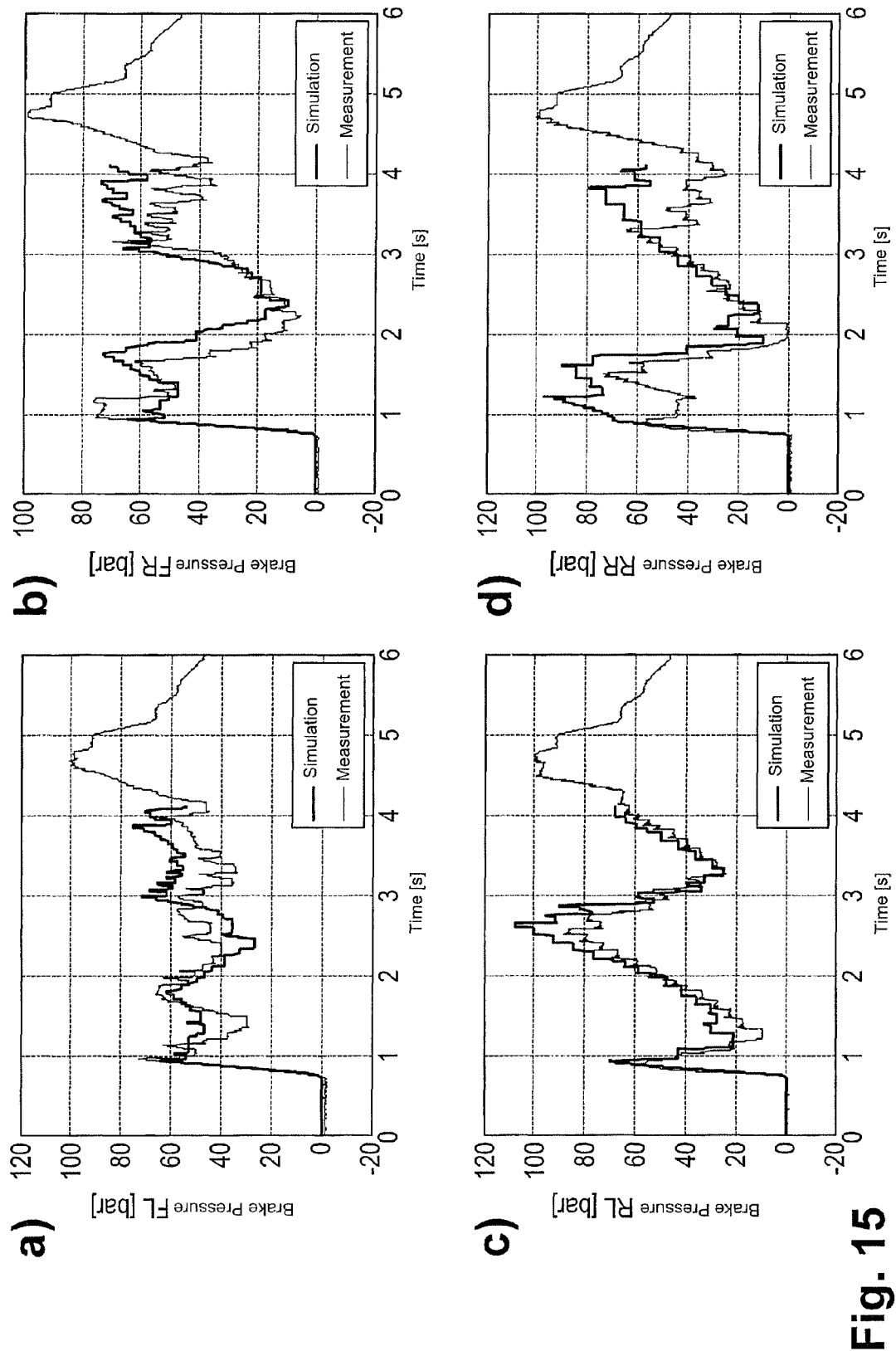
FIGS. 15(*a*)-(*d*) show the respective brake pressures on each of the wheels.
Figure 16:
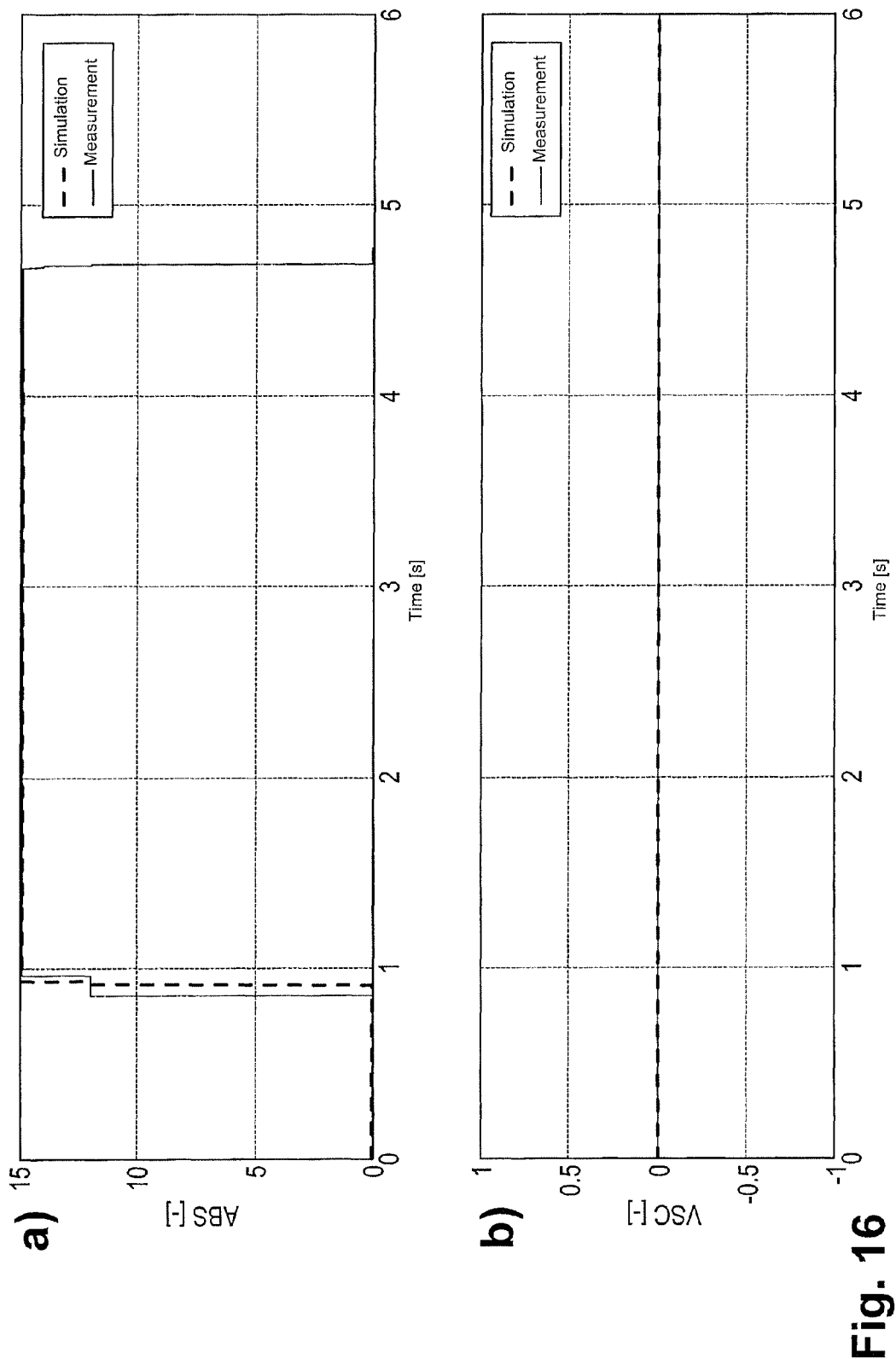
FIGS. 16(*a*)-(*b*) show the waveform of the ABS flag and the waveform of the VSC signal characteristic curve.

Accordingly, in FIG. 15, the brake pressure that is adapted to be built up on each wheel from front left to rear right is illustrated on one occasion for the measurement (thin or fainter solid line) and on another occasion for the simulation (thick or bolder solid line) in the FIGS. 15(a)-(d). Here too, the measurement and the simulation agree surprisingly well and can be drawn upon for further simulations.

Merely for the sake of completeness, the ABS flag with respect to time is illustrated in FIG. 16(a) for both the simulation and the measurement, and the VSC waveform is illustrated in FIG. 16(b).

Figure 17:
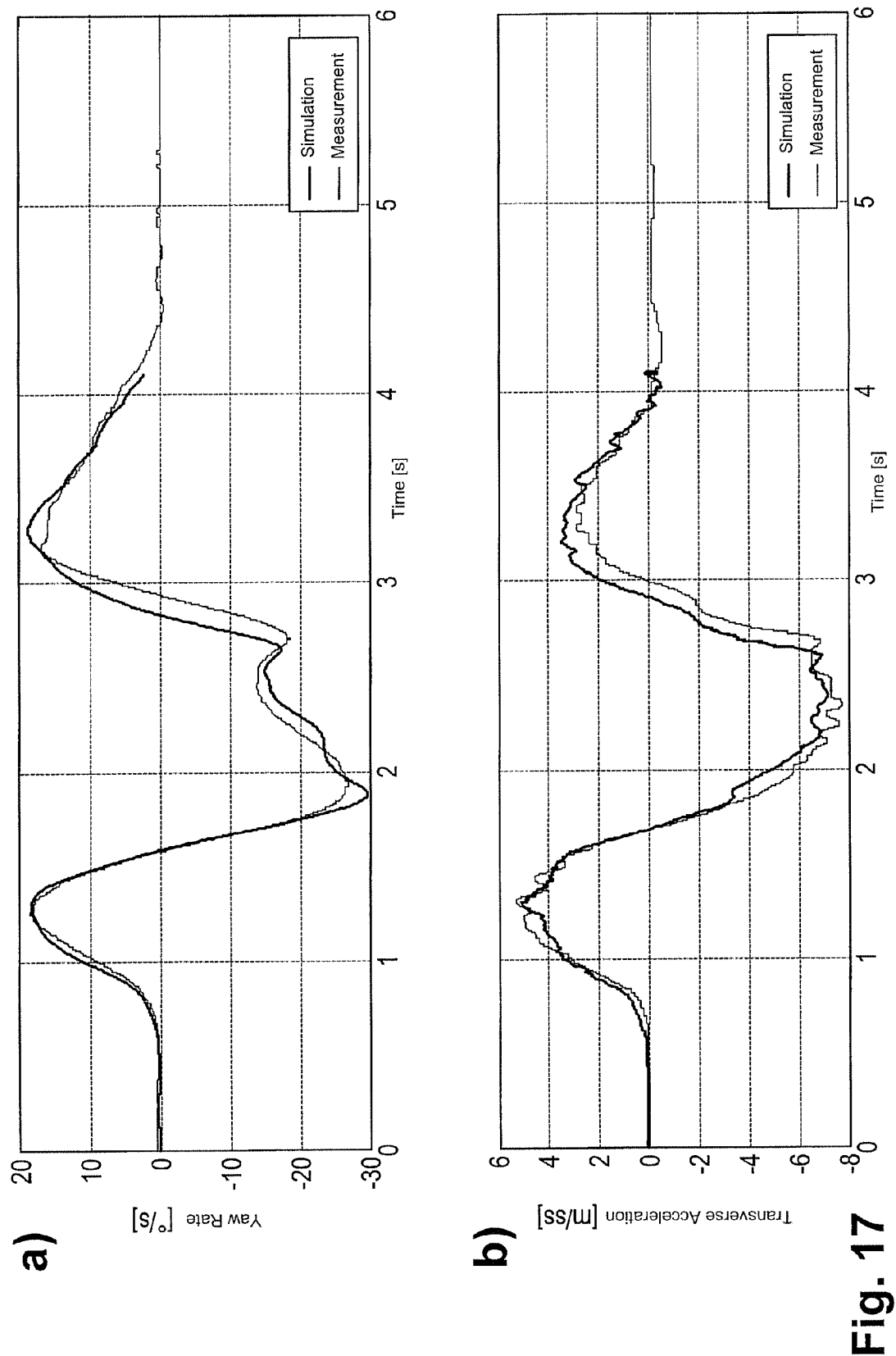
FIGS. 17(*a*)-(*b*) show the yaw rate and the transverse acceleration with respect to the situation portrayed in FIGS. 12 to 16.

FIG. 17 then reproduces the yaw rate with respect to time in FIG. 17(a) and the transverse acceleration in FIG. 17(b), wherein the measurement is implemented using a thin or fainter solid line and the simulation is in the form of a thick or bolder solid line. The waveform of the transverse acceleration follows its expected course in correspondence with the cone combination being driven. The same applies to the yaw rate arising thereby, which represents the rotation of the vehicle about its vertical axis.

The driving situation portrayed in FIGS. 12 to 17 involving an initial velocity of 108 km/h and a suddenly effected full braking action when driving around cones or in the course of an evasive maneuver was measured or simulated using a tire bearing the Bridgestone brand of type Turanza 215/55/R16 having a tire pressure of 2.7 bar on the front wheels and 3.2 bar on the rear wheels and a coefficient of friction $\mu$=1.1 between the road contact area and the dry road.

The driving situation previously illustrated in FIGS. 12 to 17 is shown in FIGS. 18 to 23 at the beginning of the full braking action in the form of a simulation without kick-down (thick or bolder solid curve) and in the form of a simulation with kick-down (thin or fainter solid curve) in order to clarify that an improvement in the driving situation is attainable due to the effect of the kick-down that is implemented at the beginning of the braking process and the sudden brief application of engine torque resulting therefrom.

Figure 18:
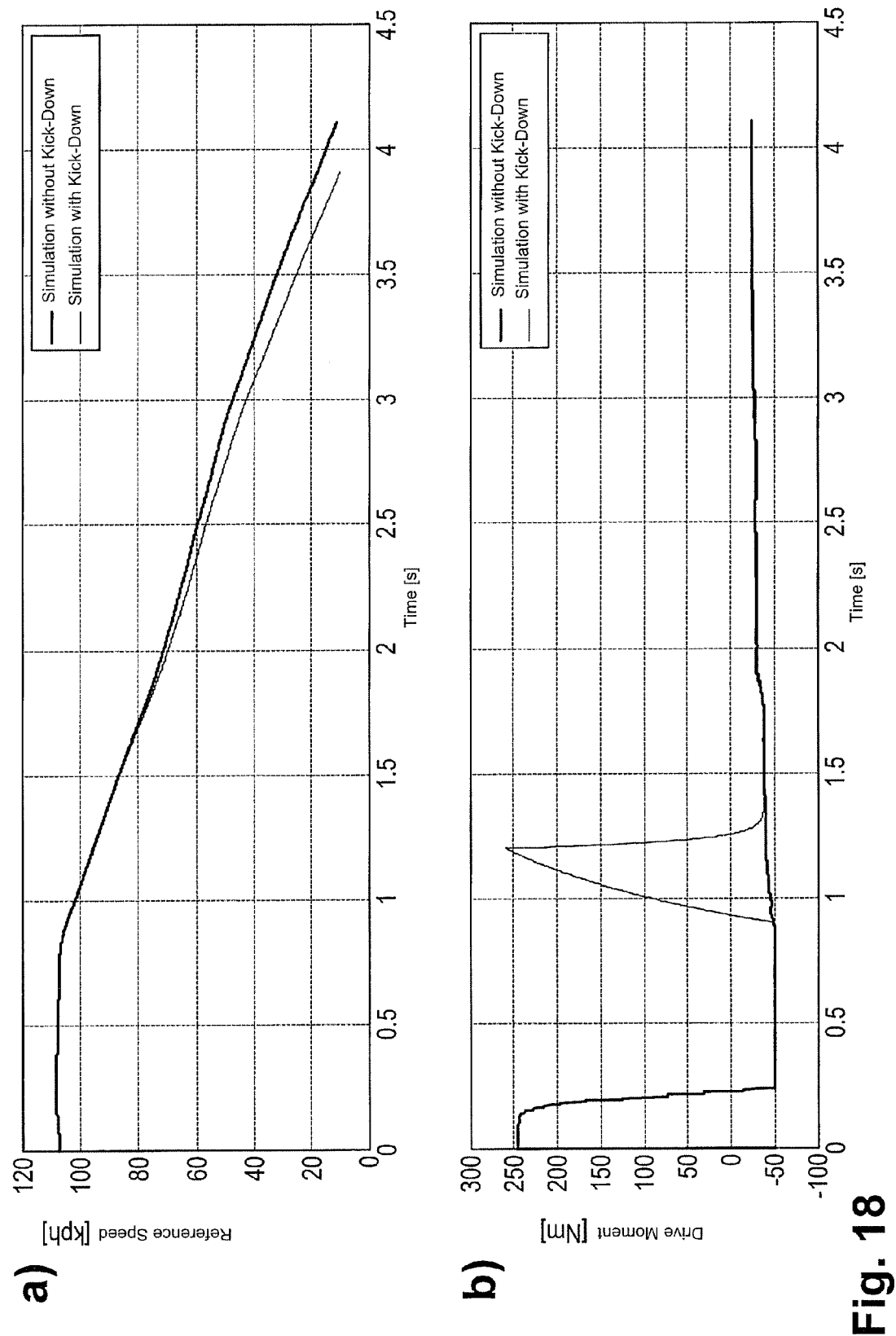
FIG. 18 shows a driving situation on the basis of 108 km/h again utilizing the excursion of the steering with full braking as portrayed in FIG. 12, in the form of a first simulation without kick-down (thick or bold solid line) and for the purposes of comparison in the form of a second simulation in accordance with the invention with kick-down (thin or fainter solid line), wherein FIG. 18(*a*) illustrates the reference speed and FIG. 18(*b*) illustrates the drive moment.
Figure 19:
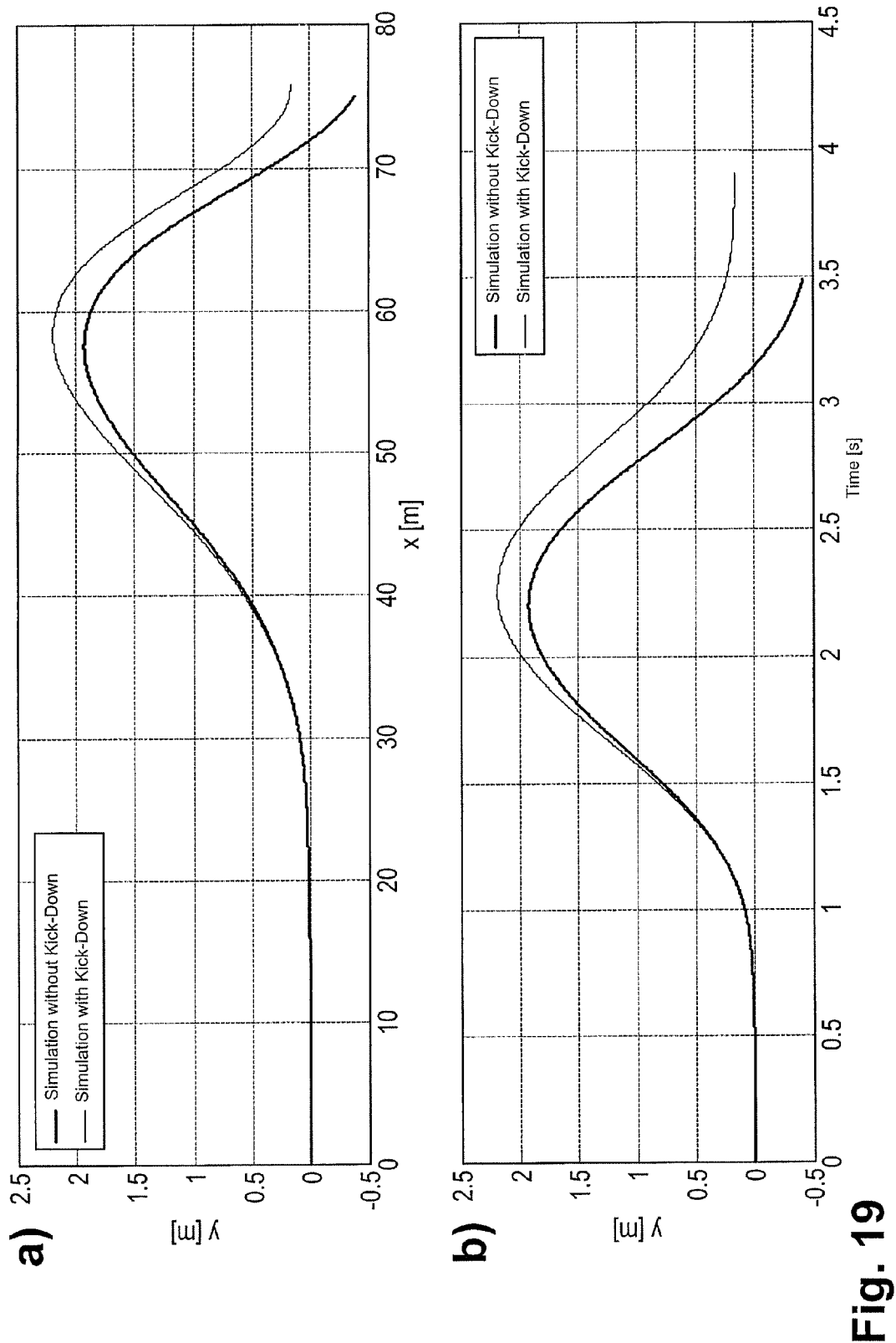
FIGS. 19(*a*)-(*b*) show the appertaining deviation of the vehicle in the y-direction with respect to the distance covered which is plotted along the x axis, and the excursion of the vehicle plotted along the y axis with respect to time which is plotted along the x axis, wherein again as was done before in FIGS. 6 to 11 the thicker or bolder solid lines show the simulation without kick-down and the thin or fainter solid lines represent the simulation with kick-down.

In FIG. 18, the reference speed with respect to time is illustrated in FIG. 18(a). The thick or bolder solid line shows the simulation without kick-down, the thin or fainter solid line shows the simulation with kick-down. Accordingly, the drive moment in Nm with respect to time in seconds is illustrated in FIG. 18(b). The kick-down takes place for instance at about some 0.8 seconds after the beginning of the simulation in accordance with the timing graph shown. Hereby, the kick-down has a time extent of about some 0.4 seconds during which the total drive moment builds up to just over 250 Nm followed by a subsequent sudden drop thereof to −50 Nm in the example being described here.

It is immediately clear from FIG. 19(a) that the transverse displacement of the vehicle in the y-direction that is attainable or wanted for driving around an obstacle is more pronounced in the case of the simulation with kick-down than it is for the case of the simulation without kick-down. This means that, due to the kick-down, a vehicle is better able to be steered and so can be driven round the cones in a better fashion or can better avoid an obstacle. This picture is also apparent from FIG. 19(b), in which the transverse displacement of the vehicle with respect to time is illustrated. Here too, the simulation with kick-down shows better handling characteristics and thus a better ability to control the vehicle than the simulation without kick-down.

FIGS. 20(a)-(d) again show the wheel speed with respect to time of the wheels from the front left to the rear right. It is perceivable that the kick-down does not have any effect upon the waveform for the wheel speeds. Any undesired acceleration of the vehicle is therefore impossible.

Figure 21:
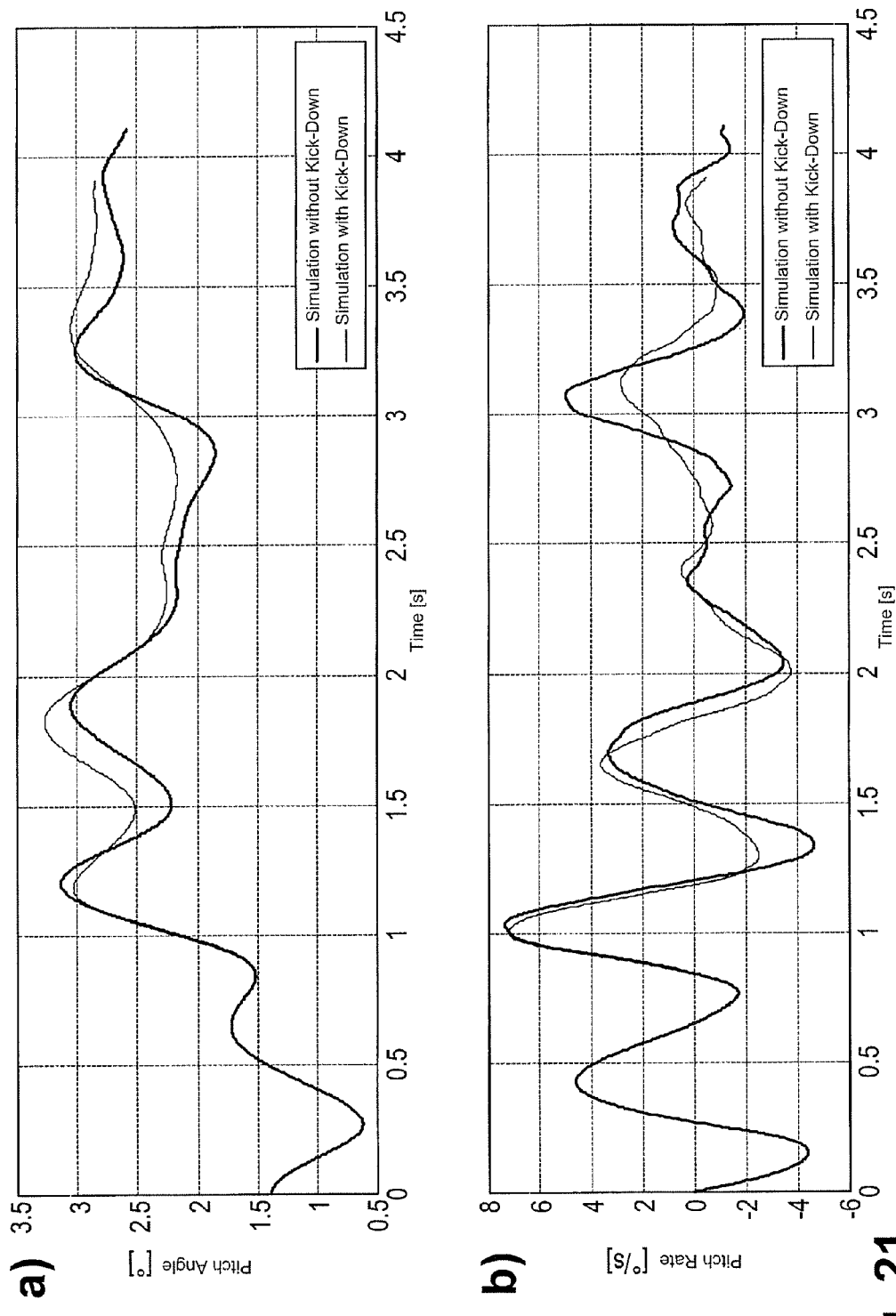
FIGS. 21(*a*)-(*d*) show the pitch angle of the vehicle appertaining to the situation portrayed in FIGS. 18 to 20, and the appertaining pitch rate (thick or bolder solid line without kick-down, thin or fainter solid line with kick-down)

In FIG. 21, the curve of the pitch angle that is adapted to be simulated in this driving situation is illustrated in FIG. 21(a) with respect to time. Here, too, it is clear that the pitch angle displays a smoother or steadier waveform in the case of the simulation with kick-down and this thus promises better mastery of the vehicle. In an analogous manner, the pitch rate is reproduced in FIG. 21(b). This too lets one assume that the behavior of the vehicle will be more good-natured in the case of a simulation with kick-down.

Figure 22:
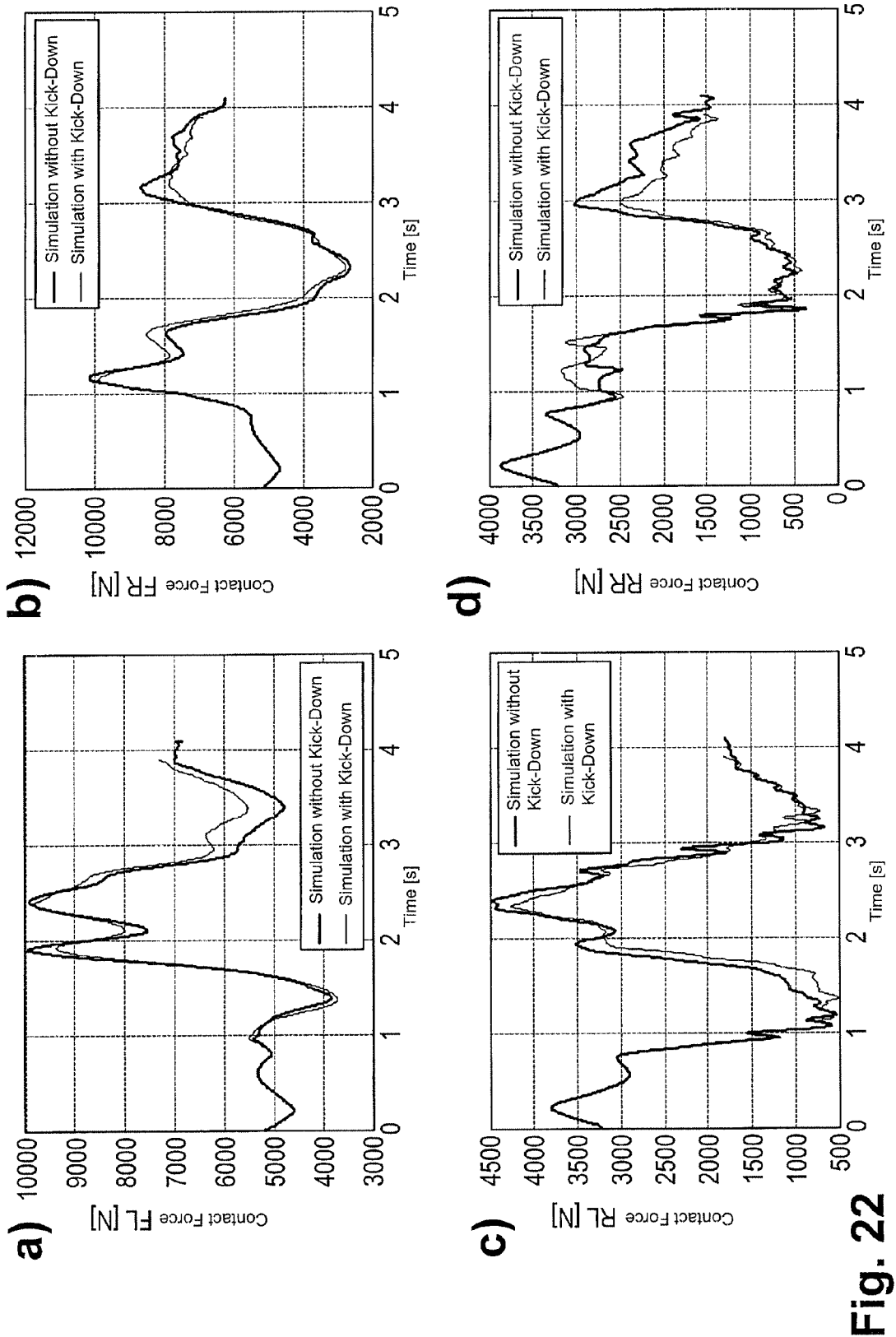
FIGS. 22(*a*)-(*b*) show the appertaining contact forces on each of the wheels in the situation portrayed in FIGS. 18 to 21.
Figure 23:
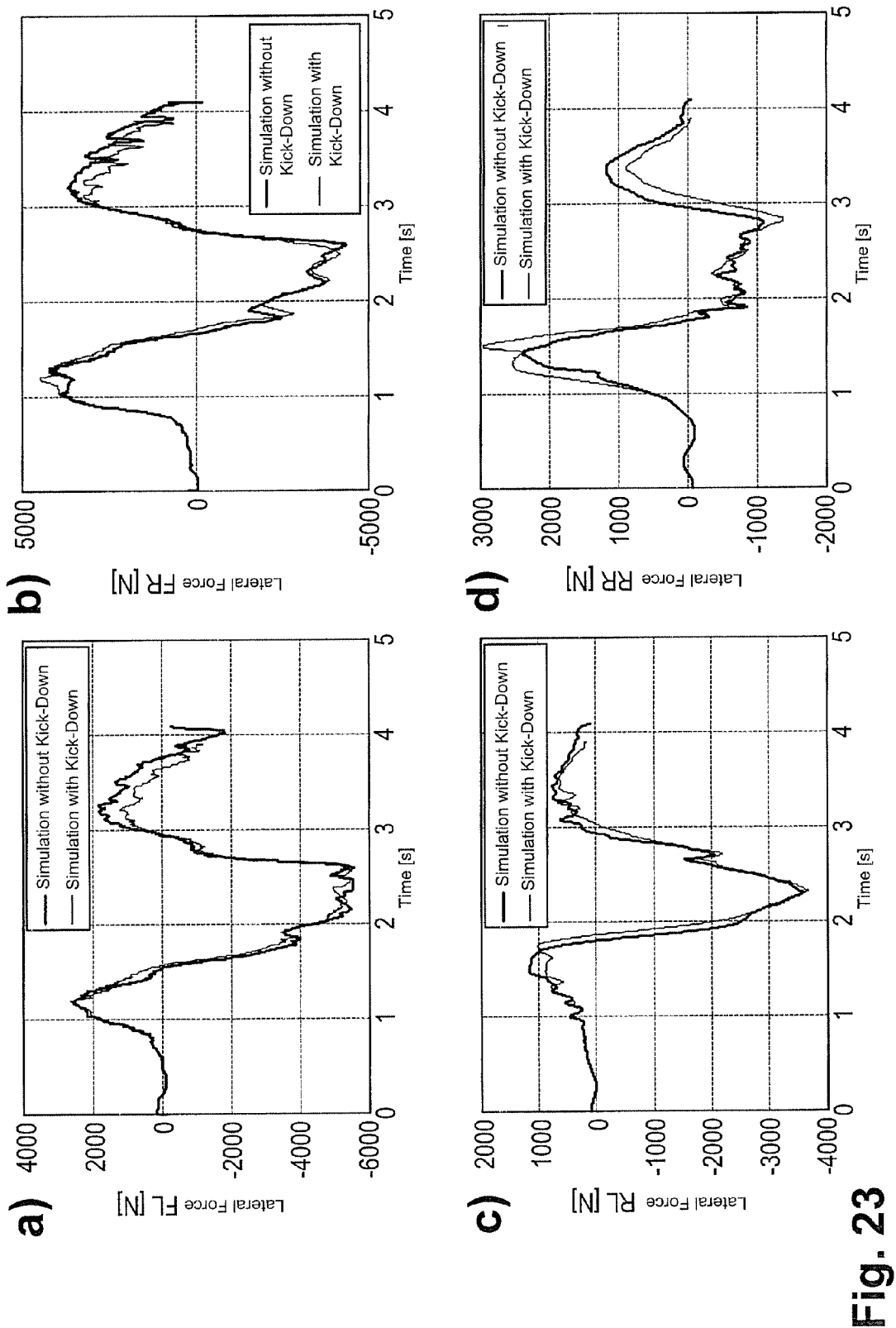
FIG. 23 shows, in correspondence with the lateral forces that are transmissible to each of the wheels with respect to the driving situation in accordance with FIGS. 18 to 22.

In FIG. 22, the contact force in newtons with respect to time in seconds is reproduced again, as previously done in FIG. 9, in FIGS. 22(a) for the front left to 22(d) for the rear right. From this representation, it follows particularly well that in the case of the simulation with kick-down (thin or weaker implemented curve) the extremely high contact forces on the front wheels without kick-down (thick or bolder solid curve) can be purposefully reduced, this thereby leading to the fact that these wheels will not wander off too far into a critical transmission range. In consequence, substantially higher braking force can be transmitted. In addition, it can immediately be established in sub Figure b) that there is an increase of the contact force at the second maximum of about 300 newtons which is higher than without kick-down, so that an averaging of the transmissible braking forces is attainable. In addition, it is clearly apparent from FIGS. 22(c) and (d) that higher braking forces are transmissible on the rear axle and the transmissible braking forces and contact forces average out so that better braking reaction forces are achievable on the outer side of the curve.

This effect is clearly confirmed in regard to the transmissible lateral forces in FIGS. 23(a)-(d) for the front left wheel to the rear right wheel. As is perceptible from FIG. 23(b), about 300 newtons of lateral force more can be transmitted to the front right wheel with the first rise of the lateral force in the case of a simulation with kick-down than one without. The same applies for the right rear wheel where likewise about 300 newtons more of lateral force can be transmitted. This leads to a more stable and safer driving situation.

A further exemplary situation is illustrated in FIGS. 24 to 30. Here, one is driving in a right-hand curve at a speed of 100 km/h and there is a sudden application of full braking with ABS, wherein the simulations without kick-down are again illustrated in fat or bolder solid lines and the simulations with kick-down in narrow or fainter solid lines.

Figure 24:
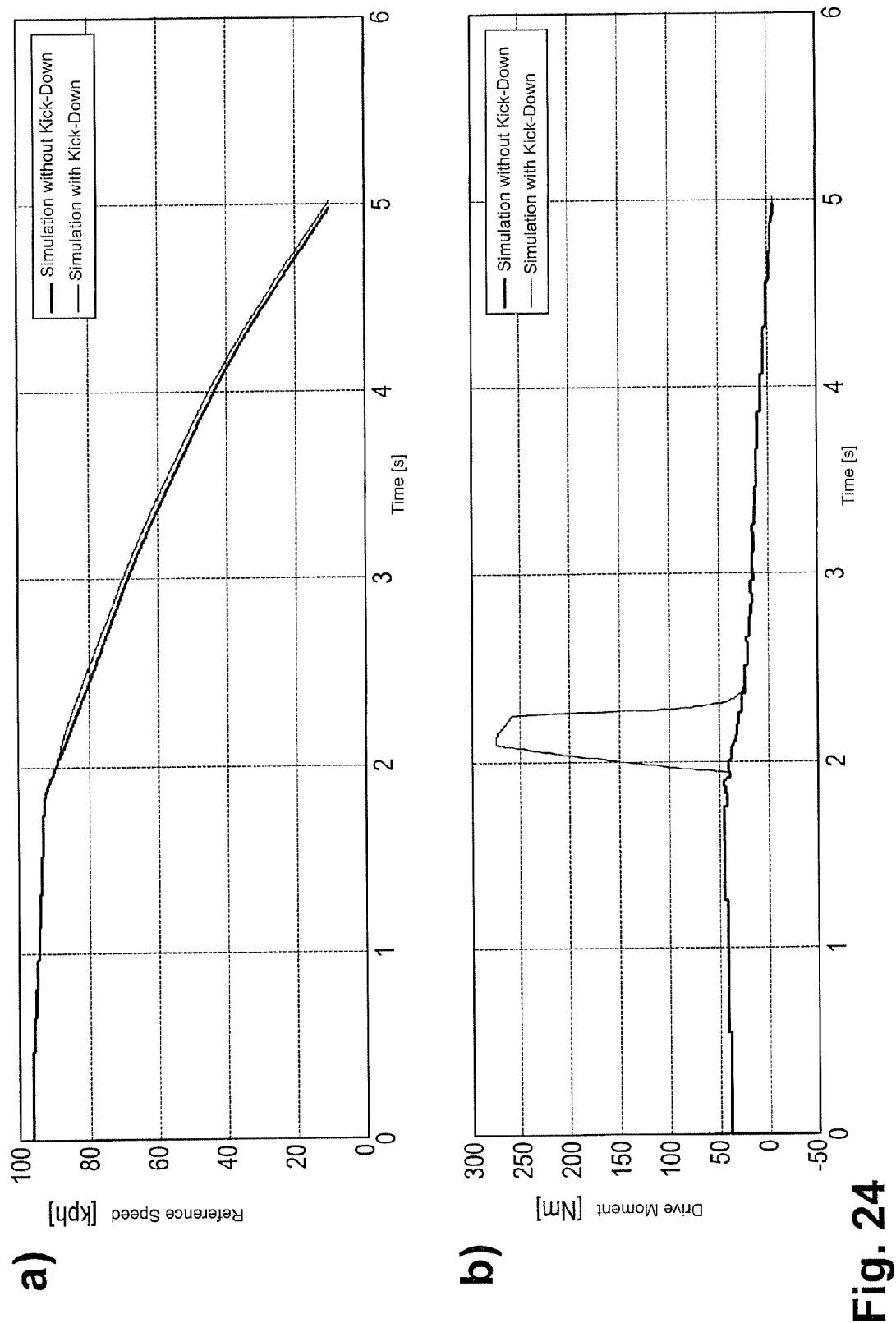
FIGS. 24(*a*)-(*b*) show a starting situation for an initial 100 km/h with full braking using ABS when driving in a right-hand curve, wherein FIG. 24(*a*) indicates the reference speed, and FIG. 24(*b*) indicates the drive moment, in each case again in the form of a simulation without kick-down (thick or bolder solid line) and in the form of a simulation with kick-down (thin or fainter solid line)

Accordingly, in FIG. 24 (as before in FIG. 6 and in FIG. 18), the reference speed in km/h is plotted with respect to time in FIG. 24(a) thereof and the drive moment in Nm is plotted with respect to time in seconds in FIG. 24(b). Here, the kick-down sets in at about 1.94 seconds from the beginning of the simulation and suddenly increases the drive moment of the engine from just under 50 Nm beforehand to significantly over 250 Nm, this then dropping back down again after approximately 0.3 to 0.4 seconds from somewhat over 250 Nm beforehand to about 50 Nm.

Figure 25:
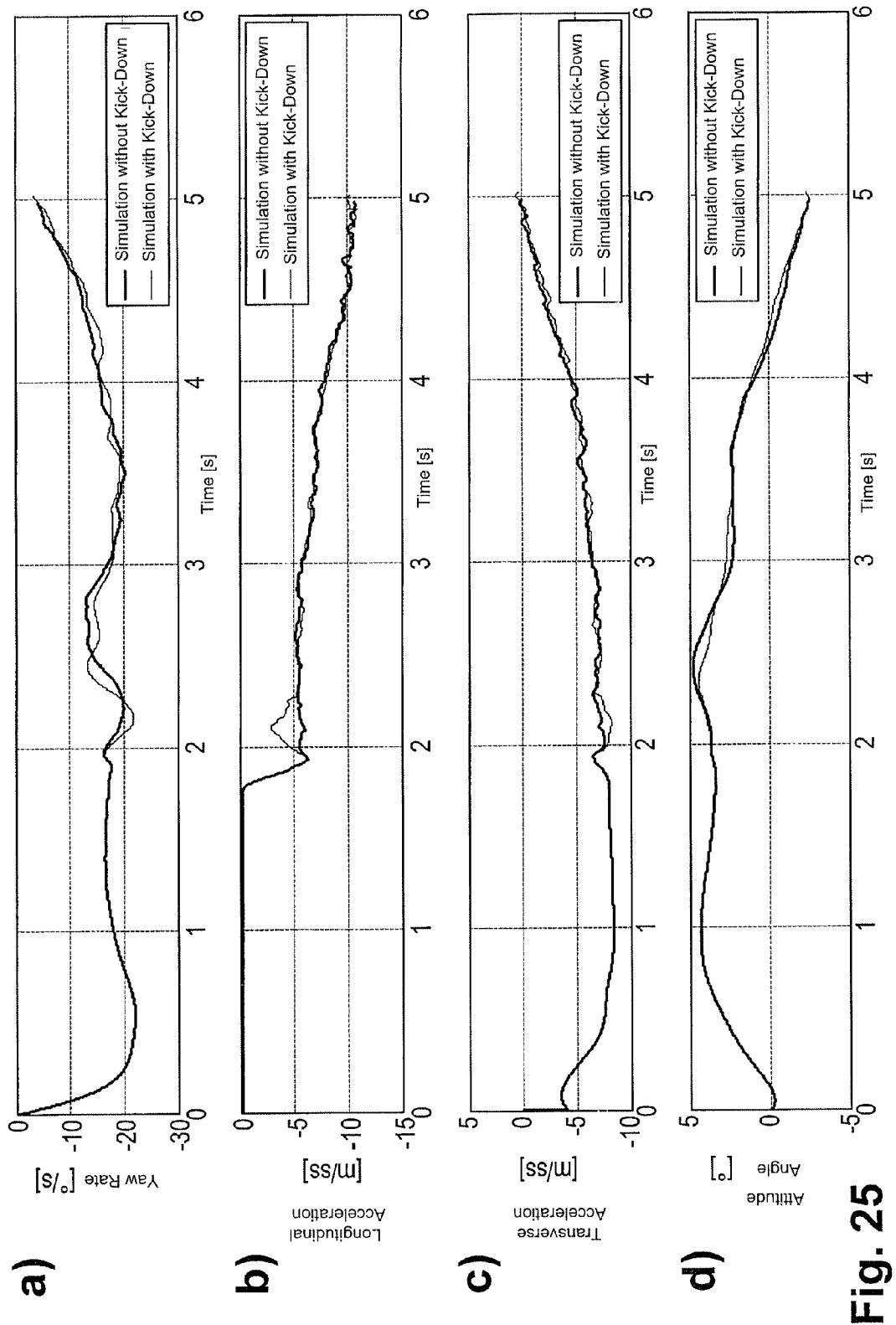
FIGS. 25(*a*)-(*d*) show the appertaining data in regard to the yaw rate, the longitudinal acceleration, the transverse acceleration and the attitude angle in the case of the situation portrayed in FIG. 24.

In FIG. 25, the yaw rate is reproduced with respect to time in FIG. 25(a). FIG. 25(b) shows the longitudinal acceleration with respect to time. FIG. 25(c) shows the transverse acceleration with respect to time. Finally, the attitude angle is plotted with respect to time in FIG. 25(d).

Figure 20:
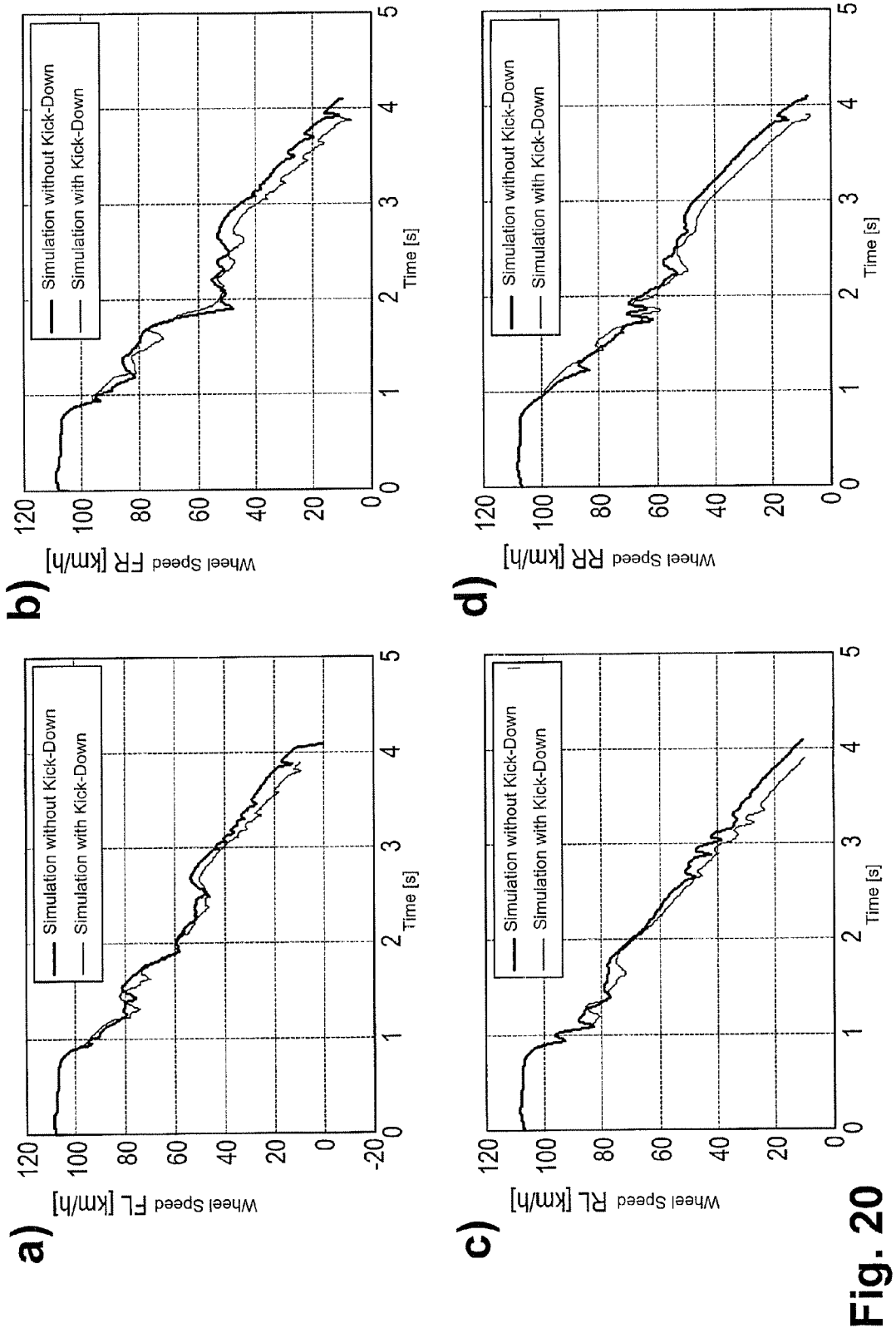
FIGS. 20(*a*)-(*d*) show the wheel speeds appertaining to the situation portrayed in FIGS. 18 and 19 both in the form of a simulation without kick-down and a simulation with kick-down.
Figure 26:
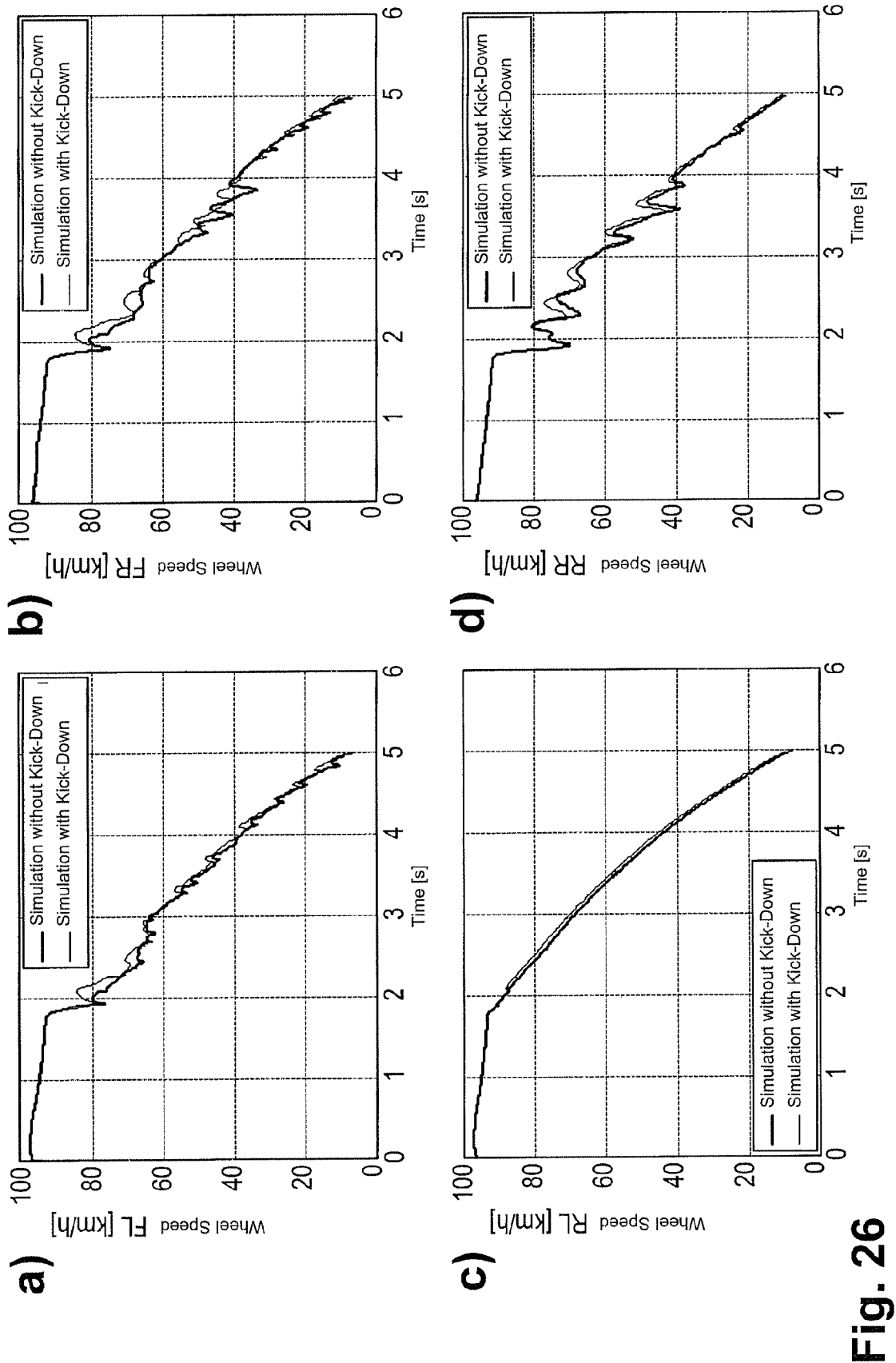
FIGS. 26(*a*)-(*d*) show the respective wheel speeds of the four wheels in accordance with the situation portrayed in FIGS. 24 and 25 (as before, thick or bolder solid line without kick-down and thin or fainter solid line with kick-down)

In FIG. 26, again as previously in FIG. 7 and in FIG. 20, the speed of the wheels is reproduced in FIG. 26(a) for the front left wheel to 26(d) for the rear right wheel. Here too, it is perceptible once more that the wheel speeds do not deviate substantially from one other and are in agreement in the case of the simulation without kick-down in thick or bolder solid lines and the simulation with kick-down in thinner or fainter solid lines. An alteration of the speed of the vehicle due to the kick-down can thus in principle be excluded when driving in a curve and also in the other operating states.

Figure 27:
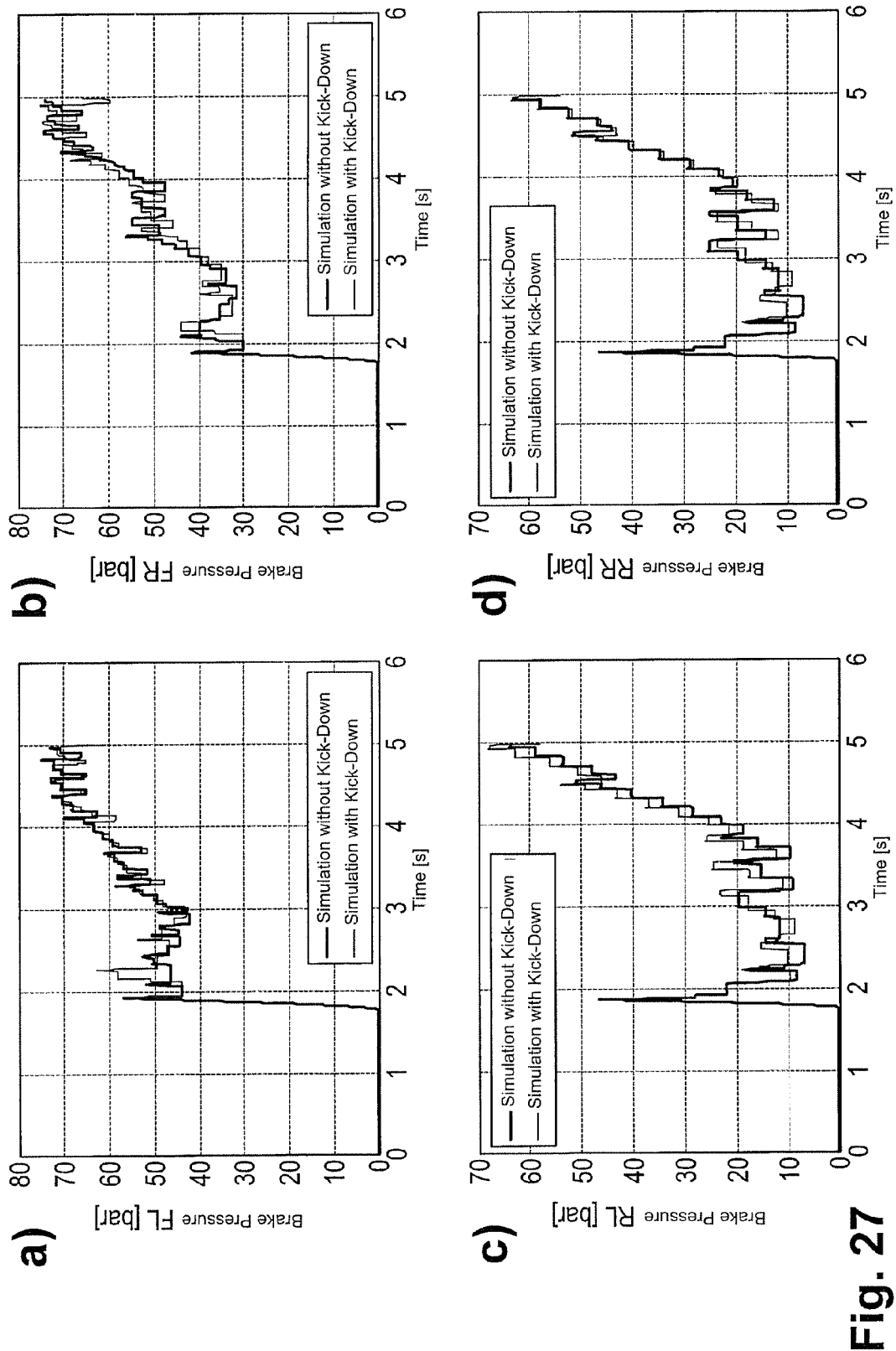
FIGS. 27(*a*)-(*d*) show the appertaining brake pressures on the four wheels with respect to the situation portrayed in FIGS. 24 to 26.

In FIG. 27, the brake pressure for the two simulated situations with and without kick-down is again represented in FIG. 27(a) for the front left wheel to FIG. 27(b) for the rear right wheel, as was previously the case in FIG. 10. It is clearly perceptible therefrom that upon the onset of full braking and the kick-down process, a substantially higher brake pressure is attainable on the rear wheels in the case of the simulation involving kick-down than that without kick-down.

Figure 28:
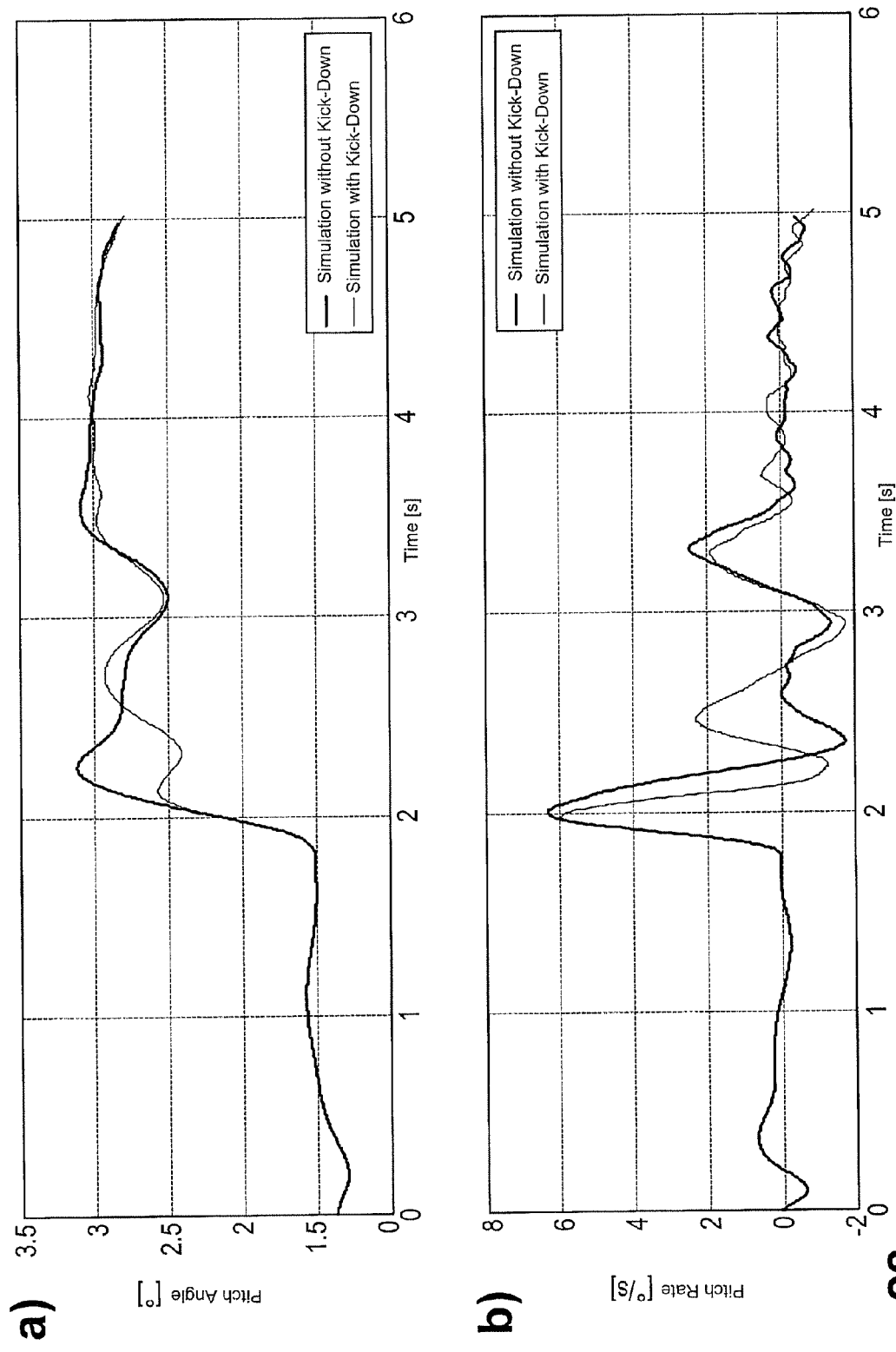
FIGS. 28(*a*)-(*b*) show the pitch angle and the pitch rate with respect to the situation portrayed in FIGS. 24 to 27.

Accordingly, from FIG. 28(a), which shows the pitch angle with respect to time, one can perceive that the kick-down sets in at about 1.94 sec. from the beginning of the simulation and leads to a substantially more dampened waveform of the pitch angle and a flattening of its amplitude as well as gently smoothing its frequency. The same applies for the pitch rate which is represented in FIG. 28(b). The situation in FIG. 28 again resembles the situation portrayed in FIGS. 8 and 21, at any rate insofar as one is concerned qualitatively with a positive evaluation of the simulation with kick-down and the surprising possibility of thereby compensating for the dynamic transfer of the axle load when a motor vehicle dives over the front wheels when braking or when driving in a curve by means of the pronounced burst of gas or kick-down.

Figure 29:
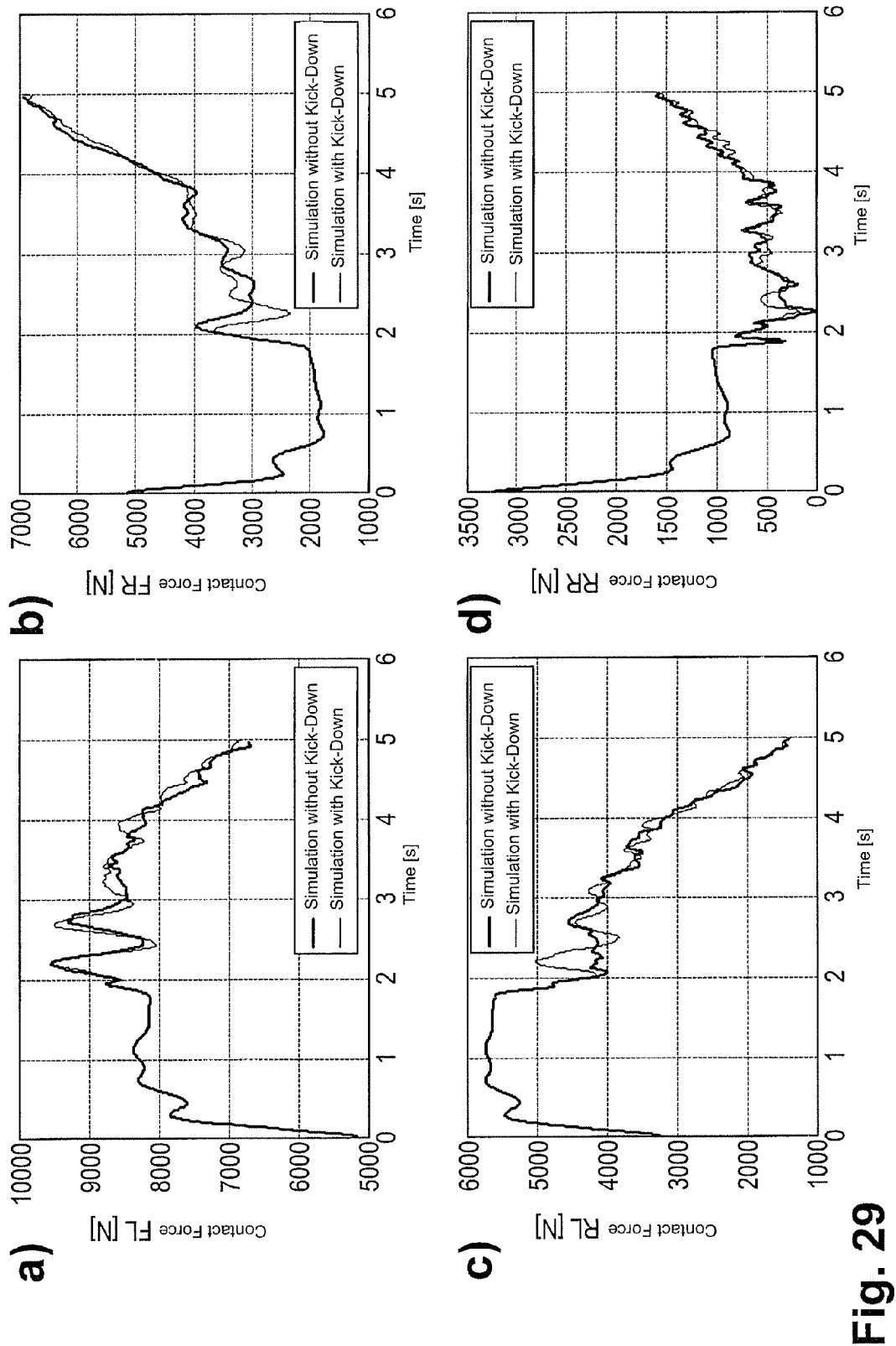
FIGS. 29(*a*)-(*d*) show the contact forces on the respective wheels with respect to the situation portrayed in FIGS. 24 to 28.

In FIG. 29, the contact force at the left front wheel up to that on the right rear wheel is then shown in FIGS. 29(a)-(d). In the case of the left front wheel, an increase in the contact force of 200 newtons is registered in the central part of the waveform on the outer side. In the case of the right front wheel, a reduction of 300 newtons is registered in the central part of the waveform on the inner side. In the case of the left rear wheel, an increase of 800 newtons in the contact force is registered on the outer wheel in the central part of the waveform and correspondingly on the right rear wheel, as is perceptible in FIG. 29(d), there is an increase of at least 150 Nm on the inner side. This means that even in this situation, wherein the right rear wheel would usually lift off without kick-down, this wheel now still has a good grip on the road so that it too can transmit forces. The situation portrayed in FIG. 29 qualitatively resembles the situation shown in FIG. 9 as well as the situation illustrated in FIG. 22.

Figure 30:
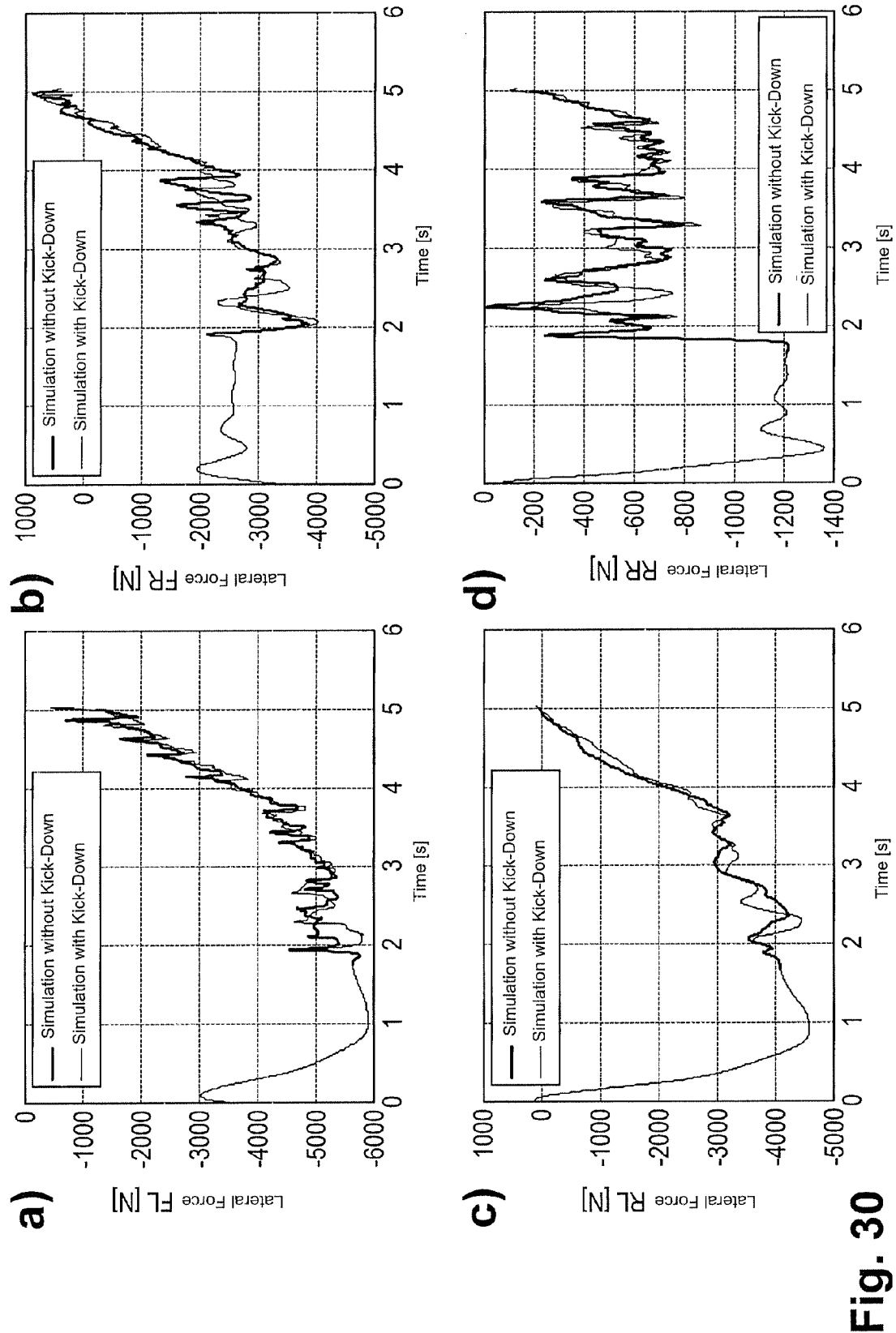
FIGS. 30 (*a*)-(*b*) show the lateral forces that are transmissible to each of the wheels in correspondence with the situation illustrated in FIGS. 24 to 29.

In FIG. 30, the lateral force of the wheels is then illustrated from the front left in FIG. 30(a) to the rear right in FIG. 30(d). Here too, it is apparent therefrom that an increase of 400 newtons in transmissible lateral force can be registered at the front left wheel in the case of the simulation with kick-down. In the case of the front right wheel, an increase of the transmissible lateral force of 200 Nm can be registered. At the rear left wheel, an increase of 400 newtons in transmissible lateral force can be established and at the right rear wheel an increase of 200 newtons in transmissible lateral force can be registered. Thus, one has once again succeeded in converting a transmissible lateral force that is going on virtually zero in the case of the simulation without kick-down into a transmissible lateral force of at least 200 newtons.

From the situation portrayed in FIGS. 24 to 30 of driving in a curve going to the right at a speed of 100 km/h and with a sudden onset of full braking, it is perceivable that, by virtue of the method in accordance with the invention, an at least partial compensation of the dynamic transfer of the axle load when the vehicle dives over its front wheels is made possible by the application of an accelerator stroke or by the deliberate provocation of a kick-down and the thereby enforced call for a brief, virtually maximum level of engine torque. This leads to a substantial improvement in the driving situation. The vehicle is more controllable. The handling is simpler. Dangerous situations can be better overcome.

Hereby, the lateral cornering forces at the rear axle have a substantial influence on the stability of the motor vehicle. The lateral cornering force versus wheel contact force characteristic curve exhibits a steep upward slope in the range of wheel contact forces present at the rear axle. That is to say, that a small alteration of the wheel contact force causes a large alteration in the lateral cornering force. Accordingly, one can achieve a higher lateral cornering force when braking in a curve due to the compensation of the dynamic transfer of the axle load; the vehicle is thus more stable when braking in a curve. Moreover one can reduce the oversteering reaction of a vehicle (with possible rolling or skidding) using the manner of procedure described above.

Figure 31:
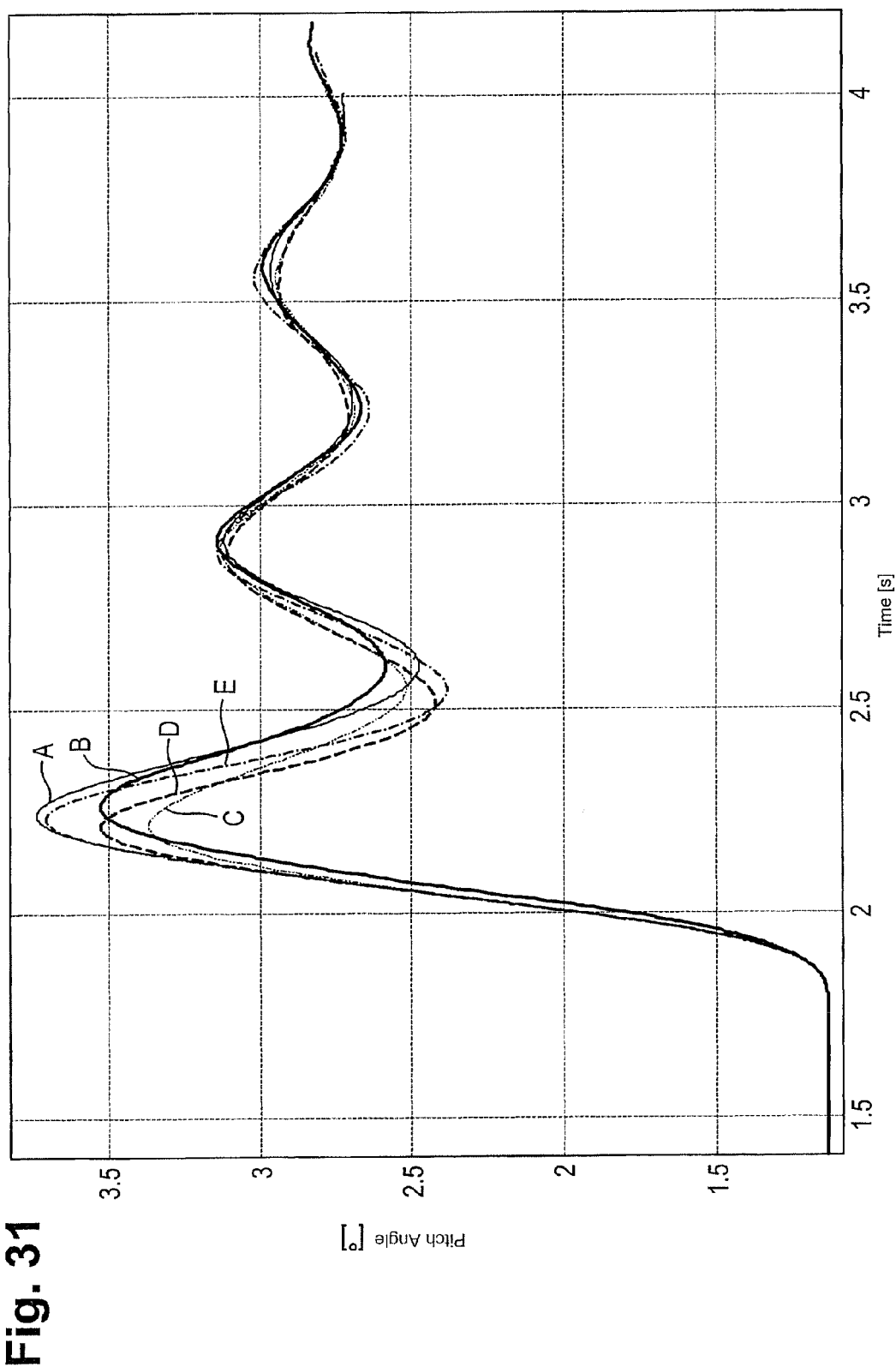
FIG. 31 shows the waveform of the pitch angle of the vehicle with respect to time once without kick-down (thin or faint solid line "A") when braking and, in comparison therewith, four exemplary line waveforms "B" to "E" of the pitch rate in the case of a full braking action with kick-down.

Finally, the pitch angle in degrees with respect to time in seconds is shown in FIG. 31, in the case of a situation such as was previously discussed in FIG. 8 for example. The thin or fainter solid line "A" shows the waveform of the pitch angle without kick-down. The thick or bold solid line "B" shows the waveform of the pitch angle in the case of a kick-down occurring exactly at the time point when the brakes were applied. The thin or fainter dash-dotted line "C" shows the waveform of the pitch angle in the case of a kick-down which set in 0.1 sec. after the point at which the brakes were applied. The thick or bold dashed line "D" shows the waveform of the pitch angle in the case of a kick-down which set in 0.2 sec. after the point at which the brakes were applied. Finally the medium strength dash-dotted line "E" illustrates the waveform of the pitch angle for the case of a kick-down which set in 0.3 sec. after the point at which the brakes were applied. Thus, it is qualitatively perceptible therefrom that the kick-down has a positive influence on the waveform of the pitch angle. This can be damped in amplitude on the one hand and the waveform can be smoothed or fade away more rapidly on the other. In addition, it can be perceived from FIG. 31 that a particularly good pitch angle waveform and hence a significant improvement in contrast to a braking process without kick-down can be obtained if, for instance, the kick-down takes place in a time window of 0.05 seconds to 1.5 seconds, preferably approximately 0.1 second from the point at which the brakes were applied.

Hereby, a method of at least partially compensating for the dynamic transfer of an axle load in a motor vehicle is proposed for the first time wherein a drive moment is increased or reduced for the purposes of balancing-out or compensating for the transference of the axle load without thereby substantially altering the speed of the motor vehicle.

Hereby, in particular, there is proposed a method of compensating for the dynamic transfer of an axle load, e.g. when part of a motor vehicle load dips over at least one front wheel, wherein, for the purposes of balancing-out or compensating for the transference of the axle load, an alteration of the drive moment or an accelerator stroke is applied or a kick-down is initiated. In particular, provision is made for an alteration of the drive moment or an accelerator stroke to be applied in the event of a full braking action at the beginning of the full braking action. Furthermore, provision is made for an alteration of the drive moment or an accelerator stroke to be applied in the course of driving in a curve or when braking in the curve in order to reduce a dipping motion and prevent break away in the special case of instability when driving in the curve or when braking whilst driving in the curve.

In the context of internal simulations made by the Applicant, it could be proven in a manner surprising even to skilled persons that compensation for or balancing of the dynamic transfer of an axle load is realizable by an alteration of the drive moment.

The alteration, in particular, the brief increase of the drive moment can be effected in the case of petrol or diesel engines e.g. by an appropriate intervention in the engine management system, for example by the application of an accelerator stroke, by altering the position of the butterfly valve or the throughput of the injection pump or by an alteration of the fuel mixture. In the case of motor vehicles which, for example, are equipped with fuel cells, are propelled by electric motors, have a gas propulsion unit or are designed as hybrid vehicles, the deliberate increase of the desired size and duration of the drive moment can, for example, be effected by an appropriate increase in the electrical power or the equivalent.

Until now, one has assumed that intervention could only be effected by means of the chassis, especially the shock absorbers and the stabilizers in order to exert an influence on the dynamic transfer of the axle load. Accordingly, all the known driving stability systems are aimed at controlling and/or regulating the respective operative states of the chassis. The possibility of influencing the dynamic transfer of the axle load by an alteration of the drive moment has been excluded until now.

By contrast, the present invention supplements the past efforts of the Applicant to produce a purposeful effect upon the dynamic transfer of the axle load in a motor vehicle in a completely surprising and advantageous manner. In the course of all these efforts, the skilled persons had not envisaged incorporating the engine control system.

In contrast thereto, the present invention takes a new path. This is the surprising advantage of the invention being discussed here, that is, that compensation for the dynamic transference of an axle load can be obtained by an alteration, preferably a brief increase in, the drive moment, in particular by means of an accelerator stroke.

If the motor vehicle pitches because of a full braking action for example and in consequence the wheel contact force at the front axle initially rises massively due to the forwardly directed dynamic transfer of the axle load, this leads to a simultaneous reduction in the load on the rear axle. Consequently, the rear tires lose contact force and the lateral cornering force decreases rapidly. This pitching effect is exactly reversed in the event of extreme acceleration of the vehicle. The vehicle rears up at the front and goes down on its knees at the back. The rear axle is more heavily loaded thereby and the load on the front axle is reduced. The present invention involving a method of deliberately affecting the dynamic transfer of the axle load that is proposed here for the first time takes positive advantage of this known pitching behavior of a vehicle that occurs when the brakes are fully applied or when full power is applied for the purposes of rapid acceleration, but without actually producing acceleration of the vehicle thereby.

It is proposed for the first time that a brief increase of the drive moment be applied e.g. at the point of applying the brakes in the event of a braking action or at the critical swerving point in the event of driving to the extreme in a curve, so that the reaction of the vehicle will actually be a proportionate righting of the motor vehicle, the attainment of compensation for the dynamic transfer of the axle load and an increase in or adaptation of the normal force and/or the lateral force of the tire that is transmissible effectively to the front and/or rear axle is obtained whilst nevertheless any acceleration of the vehicle reliably fails to materialize.

Thus, a surprising swerve during a full braking action can be avoided. Furthermore, surprising oversteering can be reduced. The danger of a rolling movement is reduced and thus finally, the danger of skidding is diminished.

Hereby, the invention takes advantage for the first time of the effect that the time constant between the increase in the drive moment and the reaction of the vehicle as such is large. Thus then, the vehicle only reacts slowly to the demanded drive moment due to its inertia. Consequently, although the drive moment can in fact influence the drive train up to the drive wheels, they will still not be accelerated however. In addition, when braking, the drive torque is thereby up against the several times higher braking force so that acceleration of the vehicle is out of the question, but an increase of the wheel contact force at the rear axle can be reliably obtained.

Initially hereby, reaction forces are produced which entail at least a slight righting of the motor vehicle, but no acceleration of the motor vehicle can be objectively detected however. Due to the at least partial straightening of the motor vehicle i.e. due to the counter-balancing of the dynamic transfer of the axle load from its extremely forward position beforehand to one in which the axle load distribution is now virtually balanced, care has in turn been taken in an advantageous manner to ensure that sufficient contact force for the rear wheels is attainable so that substantially higher braking and lateral forces can be transmitted than was the case in the critical driving situation occurring a few fractions of a second before.

The discovery of these positive effects on the dynamic transfer of the axle load by the application of an accelerator stroke in a critical driving situation such as when using full braking or when driving to the extreme in a curve for example was all the more surprising since of itself, an increase of the drive moment when braking or when driving to the extreme in a curve would be a downright prohibition for the skilled person.

Even more surprising is the discovery that the dynamic transfer of the axle load in the forward direction can be reduced and a counter-balance to the transfer of the axle load can be obtained by the production of an additional drive moment in the event of full braking or when driving in a curve.

Hereby, in advantageous manner, the pitching angle will fade away more rapidly, or will be less noticeable or will have a more damped waveform due to the compensation of the dynamic transfer of the axle load. Thus, in further advantageous manner, the fluctuation of the wheel loading will be smaller. In consequence, higher wheel braking pressures are attainable. Higher wheel braking pressures mean greater decelerations. Consequently, the ABS can be triggered off later in advantageous manner, i.e. the tires will begin to slip at a later time.

In consequence, ABS braking actions can be further optimized in an advantageous manner. When braking in curves, greater stability and a larger amount of lateral force can be achieved due to the higher rear axle load.

It is particularly advantageous that with a time limited demand for drive moment, there is now a new stabilizing magnitude, namely, the drive moment available in the ICC group. In advantageous manner, an additional sensor is not necessary. Of further advantage is also the fact that possibly no additional hardware is necessary. Furthermore, the method in accordance with the invention can also be reproduced in advantageous manner in the form of a software application which can then be installed on existing microprocessors or implemented by existing control devices.

Advantageous embodiments of the invention are apparent from the features of the subordinate Claims.

Thus, in one advantageous embodiment of the method provision is made for this to be characterized by the following steps for example: a) evaluation of the data available for the prevailing situation of the motor vehicle such as can be transmitted, for example, from sensors or the like over a CAN bus to microprocessors, control devices or the like in order to supply items of information in regard to the respective situation-dependent settings of the chassis, brakes, and/or steering which are used within the framework of an integrated chassis control system for example for the control of driving stability systems or components thereof such as the ESP, EHPS, CDC, brake assistant, IDS, UCL or the like for example, b) determination of a critical state of the motor vehicle whose dynamic transfer of the axle load must be controlled or balanced-out, c) defining the magnitude of the drive moment that is to be demanded, d) defining the duration of the drive moment that is to be demanded, and e) initiating the demanded drive moment at the predetermined magnitude and for the predetermined duration by applying a drive moment demand.

Thereby, the application of the demand for the drive moment can take place in advantageous manner e.g. in a constructionally relatively simple manner by appropriately controlling the butterfly valve or injection pump which is in any case frequently electrically and/or electromechanically operated so that this too is realizable without further additional structural expenditure.

In a further preferred embodiment of the method, provision is made for the full braking action to be implemented with ABS support. Consequently, the advantages of a purposeful correction of the dynamic transfer of the axle load by controlling the drive moment can be combined with the advantages of an ABS supported braking process. In addition, the data that is any case available in the vehicle on the CAN bus can be evaluated in the respective control devices and the necessary reactions can be better mutually coordinated and accordingly be further optimized.

In a preferred embodiment, provision is made for the presence of a full braking action to be determined by the detection of an ABS flag symbolizing the point at which the brakes are applied or by evaluation of the gradient of the brake pedal. Alternatively, provision may in advantageous manner be made for the presence of a full braking action to be determined by detecting the angular setting of the brake pedal, for example, of a fully depressed brake pedal resting against an end stop. Here, the back of the brake pedal is provided in advantageous manner with a piezo-electric crystal, a pressure sensor, a contact switch or a similar element which emits a control signal as soon as the brake pedal is fully depressed. Alternatively, an angle sensor which signals when a predetermined limiting angle is exceeded could also be provided on the brake pedal. Furthermore, the presence of a full braking action could be determined by evaluating the rising gradients of the brake pressure in the master brake cylinder.

In dependence on limiting value signals of such a nature, a time limited alteration of the drive moment could then be initiated.

In a further preferred embodiment, provision is made for a critical situation in a curve to be determined by an evaluation of the data from the ESP. Here, by utilizing the interplay between the drive control device and the data that is in any case present for the systems for regulating the dynamics of the vehicle's movement, a superior control-instance is advantageously created by means of which a counter-balancing or compensation for the dynamic transfer of the axle load can be obtained, as and when necessary, by initiating a time limited drive moment.

In correspondence with a further preferred embodiment of the method, provision is made for an increase of drive moment, in particular a kick-down or a pulse of full power of 250 milliseconds to 750 milliseconds and preferably of 300 milliseconds to 500 milliseconds duration to be initiated at the point of applying the brakes or in the event of a critical situation when driving in a curve, for example, upon the first appearance of a roll. This phase involving an increase of drive moment, in particular, the time or duration of a pulse of full power could be established as being particularly advantageous in the first internal simulations by the Applicant using internal computer models.

In a further preferred embodiment, provision is made for the increase of drive moment, in particular, the kick-down or the pulse of full power to be initiated in a time window of −0.5 seconds to +1.0 seconds, preferably of −0.01 seconds to +0.5 seconds and most preferably of +0.05 seconds to +0.25 seconds taken with reference to the point of applying the brakes as being the theoretical zero time point. It is thus ensured in advantageous manner that on the one hand the inertia of the drive or of the internal combustion engine which reacts, for example, to the opening of the butterfly valve with a delay that although extremely small nevertheless does not tend to zero, and also the inertia of the drive train are taken into consideration in such a way that the reaction forces lead to at least a partial righting of the motor vehicle or to a counter-balancing of the dynamic transfer of the axle load from the previously extremely forward position thereof back to a virtually balanced state of the motor vehicle by implementing the drive moment at precisely the correct time point, so that the advantages mentioned above of a higher wheel contact force and improved transmissibility of braking and lateral forces are then realizable.

In a further preferred embodiment of the method, provision is made for the kick-down or pulse of full power to be built up in pulsed manner by a plurality of increases of the drive moment, in particular accelerator strokes or pulses of full power. Hereby, the advantages of the modulation of the brake pressure such as is known from the ABS technique, are now carried over afresh to a kind of modulated increase of the drive moment, in particular, a modulated full accelerator stroke. This improves the controllability of the system and the matching of the forces and moments which can be produced by the application of the pulsed or modulated increase of the drive moment. Moreover, an increased drive moment can thus be demanded in phase with the pitching oscillation.

In correspondence with a preferred embodiment of the method, provision is made for the pulsed increases of the drive moment to each have a time duration of from 50 milliseconds to 150 milliseconds, partially up to 1 second, preferably about 100 milliseconds.

In correspondence with a further preferred embodiment, provision is made for a drive moment of 100 Nm to 500 Nm, preferably at least 250 Nm, and particularly preferred of at least 270 Nm to be invoked by a brief increase of the drive moment. The desired influencing of the dynamic transfer of the axle load is possible using an engine torque of this order of magnitude or somewhat still larger of up to 350 Nm or even up to 500 Nm. Hereby, an engine torque of for example more than 250 Nm, more than 270 Nm or of even more than 300 Nm is still opposed by braking forces and moments of at least approx. 3000 Nm or more so that in practical applications a ratio of something like 10:1 to 20:1 will in fact usually exist between the braking torques and the drive moments. It is thereby reliably ensured that any acceleration of the motor vehicle can be discounted, whereas straightening and counter-balancing the vehicle i.e. optimization of the dynamic transfer of the axle load is ensured.

The previously discussed advantages and positive aspects of the method in accordance with the invention can be realized in an analogous manner using the microprocessor proposed for this purpose and also by using the control device proposed for this purpose. These advantages are likewise attainable using an internal combustion engine in accordance with the invention which is equipped with a corresponding control device and/or microprocessor for carrying out the method in accordance with the invention. The same applies to a motor vehicle equipped therewith as well as to software for carrying out the method which is installed on an appropriate microprocessor or in an appropriate control device and is implemented therein.

The present invention thus provides for the first time a method of at least partially compensating for the dynamic transfer of the axle load when part of a motor vehicle load dips down over at least one front wheel. Hereby, a demand for drive moment is applied for compensating purposes. The demand for drive moment is initiated in the case of a full braking action when the brakes are fully applied and in the case of driving unstably in a curve when driving in the curve. Moreover, the present invention proposes for the first time the use of a microprocessor and also a control device for carrying out this method in accordance with the invention. Furthermore, there is indicated a driving concept which is equipped with such a control device or such a microprocessor. Finally, software for carrying out the method is mentioned. Not least, there is presented a motor vehicle which is equipped with such a control device or such a microprocessor for executing the software for the implementation of the method in accordance with the invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method for controlling a motor vehicle, comprising:
   detecting a dynamic transfer of an axle load in the motor vehicle; and
   compensating for the dynamic transfer of the axle load, the compensating comprising adjusting a drive moment of the motor vehicle without substantially altering the speed of the motor vehicle.

2. A method in accordance with claim 1, wherein the adjusting of the drive moment comprises increasing the drive moment, and the increasing of the drive moment comprises applying an accelerator stroke.

3. A method in accordance with claim 1, wherein the dynamic transfer of the axle load is a forwardly directed dynamic transfer of the axle load during a full braking action, and the adjusting of the drive moment comprises applying an accelerator stroke during the full braking action.

4. A method in accordance with claim 1, wherein the dynamic transfer of the axle load is at least one of diagonally forwardly directed and laterally directed while driving in a curve, and the adjusting of the drive moment comprises applying an accelerator stroke, is applied while driving in the curve.

5. A method in accordance with claim 1, further comprising:
   acquiring situation-dependent chassis, braking, steering data or a combination thereof related to the prevailing stability of the motor vehicle, wherein the data is transmitted by sensors that sense the current situation of the motor vehicle within the framework of an integrated chassis control system (ICC);
   determining one of a critical state of the motor vehicle and a state thereof requiring regulation with the aid of the acquired data;
   defining a magnitude of a demanded drive moment that is to be demanded for the purposes of compensating for the axle load distribution;
   defining a duration of the demanded drive moment; and
   initiating the demanded drive moment using the pre-determined magnitude and duration thereof by the application of a suitable demand.

6. A method in accordance with claim 1, wherein the dynamic transfer of the axle load is detected during a full braking action implemented with ABS support.

7. A method in accordance with claim 3, wherein the presence of the full braking action is determined by detection of an ABS flag symbolizing one of the point at which the brakes are applied, a gradient of the pedal, and the pressure of a master brake cylinder.

8. A method in accordance with claim 3, wherein the presence of the full braking action is determined detection of the brake pedal angular setting corresponding to a completely depressed brake pedal.

9. A method in accordance with claim 3, wherein one of the presence of the full braking action and the presence of a critical situation when driving in a curve is determined by evaluating data from an electronic stability program.

10. A method in accordance with claim 1, wherein the adjusting of the drive moment comprises increasing the drive moment, and during one of applying application of the brakes and the presence of a critical situation when driving in a curve, the increase of the drive moment is initiated by one of means of a kick-down and a pulse of full power having a duration of 250 ms to 750 ms.

11. A method in accordance with claim 1, wherein the adjusting of the drive moment comprises increasing the drive moment by one of means of a kick-down and a pulse of full power initiated in a time window of −0.5 seconds to +1.0 seconds after applying the brakes.

12. A method in accordance with claim 1, wherein the adjusting of the drive moment comprises increasing the drive moment by one of means of a kick-down and a pulse of full power built up in a pulsed manner from a plurality of increases of the drive moment.

13. A method in accordance with claim 12, wherein the plurality of increases of the drive moment each have a time duration of 50 ms to 150 ms.

14. A method in accordance with claim 1, wherein a drive moment of at least 250 Nm is requested by the adjusting of the drive moment by one of means of an accelerator stroke and a pulse of full power.

15. A control system for a motor vehicle, comprising:
    a microprocessor configured to:
       detect a dynamic transfer of an axle in the motor vehicle; and
       at least partially compensate for the dynamic transfer of the axle load in the motor vehicle by adjusting a drive moment without substantially altering the speed of the motor vehicle.

16. A control system for a motor vehicle, comprising:
    a control device configured to:
       detect a dynamic transfer of an axle in the motor vehicle; and
       at least partially compensate for the dynamic transfer of the axle load in the motor vehicle by one of increasing and reducing a drive moment without substantially altering the speed of the motor vehicle.

17. A motor vehicle drive comprising at least one of a control device and a microprocessor, wherein the at least one of a control device and a microprocessor is configured to:
    detect a dynamic transfer of an axle in the motor vehicle; and
    at least partially compensate for the dynamic transfer of the axle load in the motor vehicle by increasing or reducing a drive moment without substantially altering the speed of the motor vehicle.

18. A computer-readable medium having computer-executable instructions stored thereon which, when executed by a computer, will cause the computer to perform a method, the method comprising:
    detecting a dynamic transfer of an axle in a motor vehicle; and
    partially compensating for the dynamic transfer of the axle load in the motor vehicle by one of increasing and reducing a drive moment without substantially altering the speed of the motor vehicle.

19. A motor vehicle comprising:
    a control device; and
    computer-readable medium having computer-executable instructions stored thereon which, when executed by the control device, causes the control device to:
    detect a dynamic transfer of an axle in the motor vehicle; and
    partially compensate for the dynamic transfer of the axle load in the motor vehicle by increasing or reducing a drive moment without substantially altering the speed of the motor vehicle.

* * * * *